(12) United States Patent
Kakehi et al.

(10) Patent No.: US 10,629,375 B2
(45) Date of Patent: Apr. 21, 2020

(54) FILM FOR CAPACITOR AND PROCESS FOR PRODUCING SAME

(71) Applicant: Oji Holdings Corporation, Tokyo (JP)

(72) Inventors: Akihiro Kakehi, Tokyo (JP); Tatsuji Ishida, Tokyo (JP); Yoshimune Okuyama, Tokyo (JP)

(73) Assignee: OJI HOLDINGS CORPORATION, Tokyo (JP)

( * ) Notice: Subject to any disclaimer, the term of this patent is extended or adjusted under 35 U.S.C. 154(b) by 0 days.

(21) Appl. No.: 15/568,579

(22) PCT Filed: Apr. 28, 2016

(86) PCT No.: PCT/JP2016/063514
§ 371 (c)(1),
(2) Date: Oct. 23, 2017

(87) PCT Pub. No.: WO2016/175331
PCT Pub. Date: Nov. 3, 2016

(65) Prior Publication Data
US 2018/0114642 A1    Apr. 26, 2018

(30) Foreign Application Priority Data

Apr. 30, 2015   (JP) .................................. 2015-093483

(51) Int. Cl.
*H01G 4/18*    (2006.01)
*B32B 27/08*    (2006.01)
(Continued)

(52) U.S. Cl.
CPC ............. *H01G 4/145* (2013.01); *B29C 48/18* (2019.02); *B29C 55/12* (2013.01); *B32B 27/08* (2013.01);
(Continued)

(58) Field of Classification Search
CPC .. H01G 4/18; B32B 27/08; B32B 2307/7244; B32B 2307/724; B32B 2457/16
See application file for complete search history.

(56) References Cited

U.S. PATENT DOCUMENTS 3,759,647 A * 9/1973 Schrenk ................. G02B 5/287
425/133.5
6,582,807 B2 * 6/2003 Baer ...................... B29C 47/065
156/244.11
(Continued)

FOREIGN PATENT DOCUMENTS

EP           0722787 A2   7/1996
JP        2004-193181 A   7/2004
(Continued)

OTHER PUBLICATIONS

Lazić et al., Barrier Properties of Coated and Laminated Polyolefin Films for Food Packaging, May 2010, Acta Physica Polonica A., vol. 117, Issue 5, pp. 855-858 (Year: 2010).*
(Continued)

*Primary Examiner* — Nathan Milakovich
(74) *Attorney, Agent, or Firm* — Knobbe, Martens, Olson & Bear LLP

(57) ABSTRACT

A film for a capacitor having a plurality of layers, the film for capacitors satisfying the following relational expression (1): $C_{mo}/C_{mu} \geq 1.1$ wherein $C_{mu}$ is an oxygen gas permeability coefficient of the film for the capacitor, and $C_{mo}$ is an oxygen gas permeability coefficient of an equivalent film that would be obtained if the film for the capacitor were to be formed as a uniform single layer, and having a thickness of 1 to 35 μm.

13 Claims, 1 Drawing Sheet

(51) Int. Cl.
    *H01G 4/14*         (2006.01)
    *B32B 27/36*       (2006.01)
    *B32B 27/32*       (2006.01)
    *B29C 55/12*       (2006.01)
    *B32B 27/28*       (2006.01)
    *B29C 48/18*       (2019.01)
    *B32B 27/30*       (2006.01)

(52) U.S. Cl.
    CPC ............ *B32B 27/285* (2013.01); *B32B 27/30* (2013.01); *B32B 27/302* (2013.01); *B32B 27/32* (2013.01); *B32B 27/36* (2013.01); *H01G 4/18* (2013.01); *B32B 2250/05* (2013.01); *B32B 2255/10* (2013.01); *B32B 2255/205* (2013.01); *B32B 2307/518* (2013.01); *B32B 2307/724* (2013.01); *B32B 2307/7244* (2013.01); *B32B 2307/732* (2013.01); *B32B 2457/16* (2013.01)

(56) References Cited

U.S. PATENT DOCUMENTS

| | | | |
|---|---|---|---|
| 8,067,105 B2* | 11/2011 | Yoshida | B32B 5/142 |
| | | | 428/332 |
| 8,611,068 B2* | 12/2013 | Baer | B32B 7/02 |
| | | | 361/323 |
| 10,115,522 B2* | 10/2018 | Qi | B32B 27/08 |
| 2007/0281186 A1 | 12/2007 | Yoshida et al. | |
| 2010/0172066 A1 | 7/2010 | Baer et al. | |
| 2018/0068791 A1* | 3/2018 | Fujimoto | B29C 55/12 |

FOREIGN PATENT DOCUMENTS

| | | |
|---|---|---|
| JP | 2005-213351 A | 8/2005 |
| JP | 2007-009112 A | 1/2007 |
| JP | 2008-274023 A | 11/2008 |
| JP | 2013-125936 A | 6/2013 |

OTHER PUBLICATIONS

Extended Search Report issued in EP application No. 167866078.8, dated Nov. 16, 2018.

Office Action issued in Chinese application No. 201680024537.9, dated Aug. 28, 2018.

Notification of Reasons for Refusal in Japanese Patent Application No. 2017-515640, dated Jul. 12, 2018.

Office Action received in Japanese Patent Application No. 2017-515640, dated Oct. 24, 2018.

Notification of Reason for Refusal issued in corresponding Korean Patent Application No. 10-2017-7026451, dated Jan. 24, 2019.

* cited by examiner

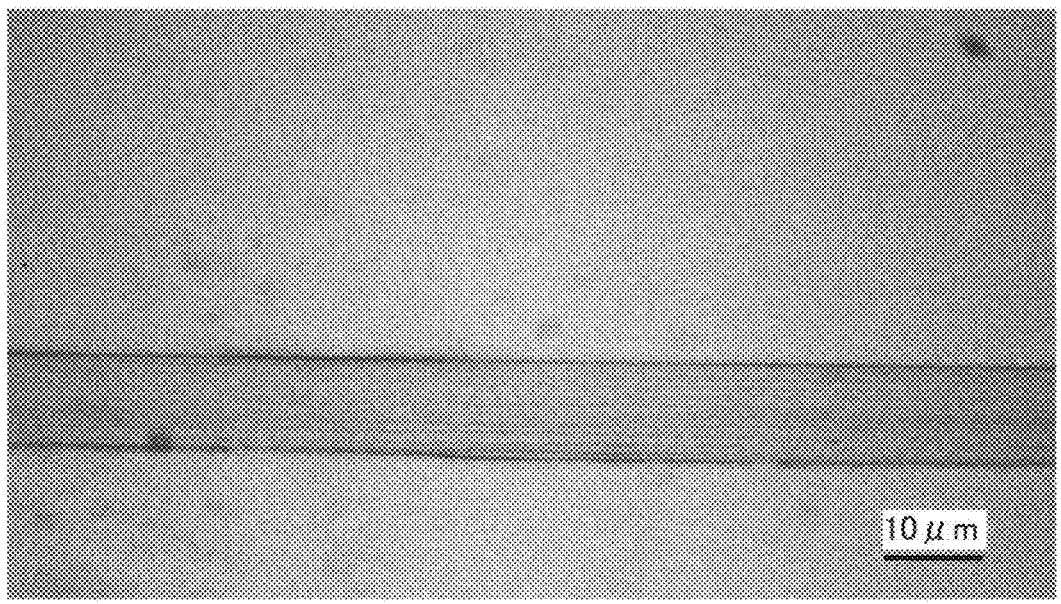

US 10,629,375 B2

FILM FOR CAPACITOR AND PROCESS FOR PRODUCING SAME

RELATED APPLICATIONS

This application is the U.S. National Phase under 35 U.S.C. § 371 of International Application PCT/JP2016/063514, filed Apr. 28, 2016, designating the U.S., and published in Japanese as WO 2016/175331 on Nov. 3, 2016, which claims priority to Japanese Patent Application No. 2015-093483, filed Apr. 30, 2015, the entire contents of which are incorporated herein by reference.

TECHNICAL FIELD

The present invention relates to a film for a capacitor that has excellent electrically insulating characteristics to supply a capacitor having a high voltage endurance at high temperature. More specifically, the invention relates to a film for a capacitor that is usable suitably for a high-capacity-type capacitor to which a high voltage is applied at high temperature, and a process for producing the film for the capacitor.

BACKGROUND ART

A film capacitor is produced by covering a metal foil layer onto a film of a thermoplastic resin such as polypropylene or polyethylene terephthalate. Such a film capacitor is used, in electronic or electrical instruments, as, for example, a high-voltage capacitor, or a filter capacitor and a smoothing capacitor for various switching power sources, converters, inverters and others.

Film capacitors are required to have a high voltage endurance, particularly, a high initial voltage endurance even when a high voltage is applied to the capacitors in a broad temperature range, for example, the range of −40 to 90° C. The film capacitors may be used, particularly, at high temperature; thus, required is a film for a capacitor to which a high voltage can be applied at high temperature.

For example, Cited Document 1 discloses a biaxially oriented film for a capacitor that includes polyethylene-2,6-naphthalene dicarboxylate, a polyolefin, and others. Cited Document 2 discloses a film for film-capacitor that is formed by laminating plural films which are produced using a T die and which include a thermoplastic resin.

PRIOR ART DOCUMENT

Patent Documents

Patent Document 1: JP-A-2007-9112
Patent Document 2: JP-A-2013-125936

SUMMARY OF THE INVENTION

Problems to be Solved by the Invention

However, these films are not yet sufficient in electrically insulating characteristics at high temperature. It is therefore difficult to gain a film for a capacitor that satisfies a high-level request from a recent market sufficiently about high voltage endurance.

Thus, an object of the present invention is to provide a film for a capacitor that is excellent in electrically insulating characteristics to supply a capacitor having a high voltage endurance at high temperature. Furthermore, provided is a capacitor produced using such a film to show an excellent voltage endurance at high temperature.

Means for Solving the Problems

The inventors have made eager investigations to find out that a correlative relationship stands up between the improvement rate (referred to also as the improvement degree) of the whole of a film against defects in the thickness direction thereof, and electrically insulating characteristics of the film for the capacitor, and further that the improvement rate can be expressed, using an oxygen gas permeability coefficient of the film. The inventors have also have made eager investigations to find out that the objects can be attained by means described below, so that the present invention has been accomplished.

Accordingly, the present invention includes the following preferred aspects and embodiments:

[1] A film for a capacitor, the film
comprising a plurality of layers;
satisfying the following relational expression (1):

$$Cmo/Cmu \geq 1.1 \qquad (1)$$

wherein Cmu is an oxygen gas permeability coefficient of the film for the capacitor, and Cmo is an oxygen gas permeability coefficient of an equivalent film that would be obtained if the film for the capacitor were to be formed as a uniform single layer; and
having a thickness of 1 to 35 μm.

[2] The film for the capacitor according to item [1],
the plurality of layers comprising a thermoplastic resin composition,
the plurality of layers being 10 or more layers, and
the thickness of the film for the capacitor being from 1 to 30 μm.

[3] The film for the capacitor according to item [2], wherein the thermoplastic resin composition comprises at least one thermoplastic resin selected from among the group consisting of polyolefin resin, polyvinyl resin, polyester resin, polyether resin, and polyamide resin.

[4] The film for the capacitor according to item [2], wherein the thermoplastic resin is one or more species selected from among the group consisting of polyolefin resin, polyvinyl resin, and polyester resin.

[5] The film for the capacitor according to item [2], wherein the thermoplastic resin is one or more species selected from the group consisting of polypropylene resin, polystyrene resin, and polyethylene terephthalate resin.

[6] A process for producing a film for a capacitor, the film
comprising a plurality layers,
satisfying the following relational expression (1):

$$Cmo/Cmu \geq 1.1 \qquad (1)$$

wherein Cmu is an oxygen gas permeability coefficient of the film for the capacitor, and Cmo is an oxygen gas permeability coefficient of an equivalent film that would be obtained if the film for the capacitor were to be formed as a uniform single layer, and
having a thickness of 1 to 35 μm,
the process comprising:
a melting step of melting a thermoplastic resin composition to obtain a melted resin composition,
a laminating step of laminating the melted resin composition to obtain a melted laminated body having a plurality of laminated layers, and
a co-extruding step of co-extruding the melted laminated body to obtain the target film.

[7] The process according to item [6], wherein the laminating step is performed using a feed block.

[8] The process according to item [6] or [7], further comprising an orienting step of orienting the film.

[9] The process according to claim 8 wherein, at the orienting step, the film is biaxially oriented.

[10] A metallized film for the capacitor, comprising the film for the capacitor according to any one of items [1] to [5], and a metal vapor deposition film on one surface or each surface of the film for the capacitor.

[11] A capacitor, comprising the film recited in item [10].

[12] A film for the capacitor that is produced by the process according to any one of items [6] to [9].

[13] A metallized film for the capacitor, including the film for the capacitor according to item [12], and a metal vapor deposition film on one surface or each surface of the film for the capacitor.

[14] A capacitor including the film according to item [13].

[15] Use of a film for a capacitor, the film
including a plurality of layers;
satisfying the following relational expression (1):

$$Cmo/Cmu \geq 1.1 \qquad (1)$$

wherein Cmu is an oxygen gas permeability coefficient of the film for the capacitor, and Cmo is the oxygen gas permeability coefficient of an equivalent film that would be obtained if the film for the capacitor were to be formed as a uniform single layer; and
having a thickness of 1 to 35 μm.

[16] A method for using a film for a capacitor, the film including a plurality of layers;
satisfying the following relational expression (1):

$$Cmo/Cmu \geq 1.1 \qquad (1)$$

wherein Cmu is an oxygen gas permeability coefficient of the film for the capacitor, and Cmo is an oxygen gas permeability coefficient of an equivalent film that would be obtained if the film for the capacitor were to be formed as a uniform single layer; and
having a thickness of 1 to 35 μm.

[17] A film for a capacitor, including 10 or more layers which includes a thermoplastic resin composition, and having a thickness of 1 to 30 μm.

[18] The film for the capacitor according to any one of items [1] to [5], and [17], wherein the thermoplastic resin which the film for the capacitor includes is polypropylene.

[19] A film for a capacitor, including a plurality of layers,
a thermoplastic resin which the film for the capacitor includes being polypropylene,
the film for the capacitor having an oxygen gas permeability coefficient Cmu of $1.8 \times 10^{-16}$ [(mol·m)/(m²·s·Pa)] or less, and
the film for the capacitor having a thickness of 1 to 35 μm.

Effect of the Invention

The present invention makes it possible to provide a film for a capacitor that is excellent in electrically insulating characteristics and resistance against being used over a long term to supply a capacitor having a high voltage endurance at high temperature.

BRIEF DESCRIPTION OF THE DRAWING

FIG. 1 is an optical microscopic sectional photograph of a film obtained in Example 2.

MODE FOR CARRYING OUT THE INVENTION

The film of the present invention is a film, for a capacitor, including plural layers,
satisfying the following relational expression (1):

$$Cmo/Cmu \geq 1.1 \qquad (1)$$

(that is, "Cmo/Cmu" is 1.1 or more)
wherein Cmu is an oxygen gas permeability coefficient of the film for the capacitor, and Cmo is an oxygen gas permeability coefficient of a film obtained when the film for the capacitor is formed in the form of a uniform single layer, and
having a thickness of 1 to 35 μm. The film obtained when the film for the capacitor is formed in the form of a uniform single layer is a film formed by melting and kneading the same thermoplastic resin composition as the film for the capacitor includes to disperse its resin component homogeneously in the composition; and the formed film has the same thickness as the film for the capacitor.

This film for the capacitor is better in electrically insulating characteristics at high temperature as compared with an equivalent film obtained in the case of changing only the number of layers in the film for the capacitor (i.e., forming an equivalent film in the form of not plural layers but a uniform single layer) without changing the thickness, the resin component nor any other factor of the film for the capacitor. Thus, the film for the capacitor has a high voltage endurance at high temperature. For this reason, a capacitor obtained using this film is better in voltage endurance at high temperature as compared with the equivalent film, which is obtained in the case of changing only the number of layers in the film for the capacitor (i.e., in the case of forming the equivalent film in the form of not plural layers but a uniform single layer) without changing the thickness, the resin component nor any other factor of the film for the capacitor.

The principle that the film of the present invention expresses the high electrically insulating characteristics is described. The inventors have considered that about the dielectric breakdown of a film, a moiety of the film that is poorest in withstand voltage functions as a starting point of the breakdown, and from this point, the dielectric breakdown starts. In other words, the inventors have considered that even about films produced from the same material, a film having many defective portions, such as pinholes, out of these produced films, is a film low in withstand voltage while a film having a few defective portions, out of the same, is a film high in withstand voltage. Thus, <1> as an index of the degree of defects in a film, the inventors have paid attention to a relationship between the helium gas permeability coefficient and the oxygen gas permeability coefficient of the film, and the number of layers in the film. Moreover, <2> the inventors have paid attention to a relationship between the above-mentioned relationship, and the dielectric breakdown voltage, at high temperature, of a capacitor using the film.

As a result, the inventors have found out about the relationship <1> that no correlative relationship stands up between the number of the layers in the film and the helium gas permeability coefficient of the film, and that a correlative relationship stands up between the number of the layers in the film and the oxygen gas permeability coefficient of the film, and when the number of the layers in the film is two or more, the film is decreased in oxygen gas permeability coefficient. The inventors have also found out about the relationship <2> that when the oxygen gas permeability coefficient Cmu satisfies the above-mentioned relational expression (1), the film for the capacitor is excellent in dielectric breakdown voltage property at high temperature. Cmu is the oxygen gas permeability coefficient of the above-mentioned film for the capacitor, which includes plural layers (two or more layers). Cmo is the oxygen gas permeability coefficient of a film obtained when the film for the capacitor is formed in the form of a uniform single layer (monolayer). In short, Cmo/Cmu is the ratio of Cmo to Cmu. About Cmo, the oxygen gas permeability coefficient in each of Comparative Examples 1, 4 and 7 in the present document DESCRIPTION corresponds to this coefficient Cmo.

The Cmo/Cmu ratio is a parameter representing the improvement rate of the whole of the film against defects in the thickness direction thereof. In other words, as the Cmo/Cmu ratio is higher, defects in the thickness direction are more largely overcome. As a result, notwithstanding that a film for a capacitor that includes plural layers has the same thickness as a monolayered film, the former film is better in electrically insulating characteristics and resistance against being used over a long term than the latter film.

About Cmo/Cmu (expressed also as "Cmo÷Cmu"), the relationship "Cmo/Cmu≥1.1" is preferred, that "Cmo/Cmu≥1.15" is more preferred, that "Cmo/Cmu≥1.2" is even more preferred, that "Cmo/Cmu≥1.25" is particularly preferred, and that "Cmo/Cmu≥1.3" is exceedingly preferred. Moreover, about the Cmo/Cmu ratio, from the viewpoint of the advantageous effects of the present invention, the relationship "Cmo/Cmu≤100" is preferred, that "Cmo/Cmu≤20" is preferred, that "Cmo/Cmu≤10" is more preferred, that "Cmo/Cmu≤2" is even more preferred, and that "Cmo/Cmu≤1.5" is particularly preferred.

The oxygen gas permeability coefficient Cmu of the film of the present invention is not particularly limited as far as the Cmo/Cmu ratio satisfies the expression (1). When the resin component of the film of the invention is polypropylene, regarding the upper limit value of Cmu, Cmu is preferably $1.8 \times 10^{-16}$ [(mol·m)/(m²·s·Pa)] or less, more preferably $1.7 \times 10^{-16}$ [(mol·m)/(m²·s·Pa)] or less, even more preferably $1.6 \times 10^{-16}$ [(mol·m)/(m²·s·Pa)] or less. Regarding the lower limit of Cmu, Cmu is preferably $1.0 \times 10^{-17}$ [(mol·m)/(m²·s·Pa)] or more, more preferably $1.0 \times 10^{-16}$ [(mol·m)/(m²·s·Pa)] or more, even more preferably $1.1 \times 10^{-16}$ [(mol·m)/(m²·s·Pa)] or more, in particular preferably $1.4 \times 10^{-16}$ [(mol·m)/(m²·s·Pa)] or more. When the resin component is polystyrene, regarding the upper limit value of Cmu, Cmu is preferably $9.2 \times 10^{-17}$ [(mol·m)/(m²·s·Pa)] or less, more preferably $9.0 \times 10^{-17}$ [(mol·m)/(m²·s·Pa)] or less, even more preferably $8.5 \times 10^{-17}$ [(mol·m)/(m²·s·Pa)] or less, even more preferably $8.0 \times 10^{-17}$ [(mol·m)/(m²·s·Pa)] or less. Regarding the lower limit of Cmu, Cmu is preferably $1.0 \times 10^{-18}$ [(mol·m)/(m²·s·Pa)] or more, more preferably $3.0 \times 10^{-18}$ [(mol·m)/(m²·s·Pa)] or more, even more preferably $5.0 \times 10^{-18}$ [(mol·m)/(m²·s·Pa)] or more. When the resin component is polyethylene terephthalate, regarding the upper limit value of Cmu, Cmu is preferably $2.0 \times 10^{-18}$ [(mol·m)/(m²·s·Pa)] or less, more preferably $1.9 \times 10^{-18}$ [(mol·m)/(m²·s·Pa)] or less, even more preferably $1.85 \times 10^{-18}$ [(mol·m)/(m²·s·Pa)] or less. Regarding the lower limit of Cmu, Cmu is preferably $1 \times 10^{-19}$ [(mol·m)/(m²·s·Pa)] or more, more preferably $1.0 \times 10^{-18}$ [(mol·m)/(m²·s·Pa)] or more, even more preferably $1.2 \times 10^{-18}$ [(mol·m)/(m²·s·Pa)] or more. The gas permeability coefficient is measurable in accordance with JIS K7126-1:2006. For example, a film (test piece) is set to a gas permeability coefficient measuring instrument (for example, a gas permeability coefficient measuring instrument BR-3, BT-3, manufactured by Toyo Seiki Kogyo Co., Ltd.) to measure the gas permeability coefficient thereof multiple times by a pressure sensor method, and the average value of the measured values is multiplied by the thickness of the test piece. In this way, the gas permeability coefficient can be calculated out. The used testing gas is a gas (such as oxygen or helium) having a purity of 99.5% or more. Cmu is the oxygen gas permeability coefficient of the film, which is composed of plural layers (two or more layers), and Cmo is the oxygen gas permeability coefficient of a film obtained when the plural-layer-composed film is formed in the form of a uniform single layer (monolayer).

A description is made about a method for adjusting the oxygen gas permeability coefficient Cmu of the film of the present invention, and the Cmo/Cmu ratio thereof. In the invention, examples of the method for adjusting Cmu, and the Cmo/Cmu ratio include a method (i) of changing the number of film-constituting-layers in the film; a method (ii) of laying, onto one or each of the two surfaces of the film, a different layer to render the film a film including the different layer(s); and a method (iii) of setting resin components in the film appropriately.

It is presumed that the relationship <1> is based on a principle described below. However, it is clearly stated herein that a film in accordance with the present invention is within the scope of the invention even if the reason why the film produces the above-mentioned excellent advantageous effects is different from a reason described below.

Principle <1>:

A thermoplastic resin is made of chain-form molecules large in molecular weight. When the resin is a crystalline polymer, the polymer has crystalline regions and non-crystalline (amorphous) regions. In the non-crystalline regions, the molecular chains vibrate thermally. The molecular chains have, therebetween, gaps called free volumes. The free volumes are always changed in value by the thermal vibration of the molecular chains. When molecules or atoms of a gas permeate a film, the gas initially enters one of the free volumes of the thermoplastic resin. The gas then enters next one of the free volumes while the gas pushes and spreads the molecular chains that are thermally vibrating. This process is repeated so that the gas permeates the film to reach finally the opposite surface of the film.

Helium is made of a single helium atom to be a gaseous monoatomic molecule at ambient temperature, and is a very small substance. Regardless the value of the free volumes, helium easily passes through gaps between the molecular chains because of the smallness. Helium can permeate the film to reach the opposite surface thereof. It can be therefore considered that the film shows a helium gas permeability coefficient of a constant value without being affected by the value of the proportion of defects in the film.

In the meantime, oxygen is a molecule that is made of two oxygen atoms and is gaseous at ambient temperature. As described above, when oxygen molecules pass through a film, the oxygen molecules initially enter a free volume of a thermoplastic resin of the film, and then enter the next free volume while pushing and spreading the molecular chains that are thermally vibrating. This process is repeated, and finally the oxygen molecules pass through the film to reach the opposite surface thereof. However, when the film has defects such as pinholes, the oxygen molecules easily pass through portions of the defects without entering any free volume of the thermoplastic resin, so as to be shifted through the defective portions. Corresponding to the shift, the film becomes larger in oxygen gas permeability coefficient (oxygen gas more easily permeates the film). In other words, as a film is larger in defect proportion, the oxygen gas permeability coefficient thereof is calculated out as a larger value. Any substance should originally have an intrinsic oxygen gas permeability coefficient. However, when a film is made thin as in the present invention, its defective portions largely affect the gas permeability coefficient of the film. It is therefore considered that the oxygen gas permeability coefficient in the invention is usable as an index value on which the defect proportion of the film is reflected.

The reason why the oxygen gas permeability coefficient of the film of the present invention is changed by the laminating of its layers would be as follows: When a film is produced, the film is not easily obtained with a complete evenness in the state that defects are not present at all. Actually, the film would have fine defects such as pinholes with some possibility. When the oxygen gas permeability coefficient of such a film is measured, a gas would pass more easily through its fine defective portions such as pinholes than through its portions having no fine defect (non-defective portions). Thus, when the film is made of a uniform single layer, oxygen gas easily passes through the defective portions. However, when the film is render not a uniform single layer but a film of two layers obtained by laminating, onto the uniform single layer, a layer further, the film would be made of the following combination without defective portions that the individual layers have being put onto each other: a combination of the defective portions with its non-defective portions in the thickness direction. Thus, oxygen gas would not easily pass through the film. When the number of laminated layers of the film is increased to three or four layers in the same manner as described above, lowered is the ratio of the thickness of layers having one or more defective portions, out of the entire layers, to the thickness of the whole of the film. In other words, an improvement is made in the ratio of non-defective portions in the thickness direction of the film to the thickness of the whole of the film. As a result, the film would be lowered in oxygen gas permeability coefficient. A lowering in this ratio of the non-defective portions in the thickness direction of the film in the thickness of the whole of the film would be reflected onto a lowering in the oxygen gas permeability coefficient to improve the film in breakdown strength. For the present invention, the inventors have found out that a correlative relationship stands up between electrically insulating characteristics of a film and the oxygen gas permeability coefficient thereof. The inventors have also found out that in light of the matter that gas species are various, the same or similar correlative relationship stands up also about other gases (such as nitrogen gas and carbon dioxide gas). When an appropriate gas species is selected and the permeability coefficient of a film about the gas is measured, the C'mo/C'mu ratio of the film about the gas can be calculated out. It is therefore possible to gain an index of the improvement rate of the whole of a film against defects in the thickness direction thereof. Moreover, the Cmo/Cmu ratio of the film can be estimated by conversion from the C'mo/C'mu ratio.

It is presumed that the relationship <2> is based on a reason (mechanism) described below. However, it is clearly stated herein that a film in accordance with the present invention is within the scope of the invention even if the reason why the film produces the above-mentioned excellent advantageous effects is different from a reason described blow.

Principle <2>

Also in a voltage endurance test of a film, defective portions of the film would easily suffer from dielectric breakdown. Thus, by making the film into plural layers, the ratio of non-defective portions in the thickness direction of the film in the thickness of the whole of the film is improved. It is presumed that the improvement makes an improvement of the film in breakdown strength.

In the film of the present invention for the capacitor, which is made (includes) plural layers, the plural layers are each preferably made of a thermoplastic resin composition, or constituted by a thermoplastic resin composition. The layers are usually 2 layers or more, preferably 10 layers or more, more preferably 12 layers or more, even more preferably 40 layers or more, in particular preferably 80 layers or more, exceedingly preferably 160 layers or more, for example, 200 layers or more. When the number of the layers in the film of the invention for the capacitor is the above-mentioned lower limit or more, the film is excellent in electrically insulating characteristics to be desirable. The layers in the film of the invention for the capacitor are not particularly limited, and are, for example, 3000 layers or less.

The thickness (A) of each of the layers constituting the film of the present invention for the capacitor (referred to also as the "layer thickness (A) per layer") is not particularly limited. The layer thickness (A) per layer is preferably 0.65 nm or more, more preferably 1 nm or more, even more preferably 6.5 nm or more, even more preferably 10 nm or more, in particular preferably 20 nm or more in order that a film can be obtained in which the disturbance of the layer structure is restrained into a small level. The layer thickness (A) per layer is preferably 3 µm (=3000 nm) or less, more preferably 1 µm (=1000 nm) or less, even more preferably 900 nm or less, even more preferably 800 nm or less, even more preferably 650 nm or less, in particular preferably 500 nm or less in order that the advantageous effects of the present invention can be further heightened by increasing the number of the laminated layers. When the layers constituting the film for the capacitor are different in thickness from each other, the layer thickness (A) per layer means the average value of the thicknesses of the individual layers. In other words, the layer thickness (A) per layer can be calculated out by measuring the thickness of the whole of the film through, for example, a paper piece thickness measuring instrument or an optical microscope, and then dividing the thickness by the number of the laminated layers.

About the film of the present invention for the capacitor, the individual layers constituting the film may be the same or different in thickness. It is preferred to set the ratio of the thickness $D_R$ of any one of the layers to the thickness of the layer or each of the layers $D_A$ which is adjacent thereto ($D_R:D_A$) into the range of 5:95 to 95:5 since at the time of making the melted resin composition into laminated layers, turbulent flow of the melted resin composition can be restrained into a small level to make the laminated state of the individual layers good. It is more preferred that the individual layers constituting the film are entirely equal in thickness to each other ($D_R:D_A=50:50$). In a process from the step of manufacturing the melted resin composition into the laminated layers to the step of co-extruding the melted laminated body, the layer structure of the melted resin composition may be distributed by turbulent flow of the melted resin composition. In this case, when the outermost layer on each of the front and rear side of the melted laminated body (hereinafter referred to as the skin layer) is larger in thickness than the other layer(s), the disturbance of the layer structure can be restrained. In the present invention, about the thickness $D_N$ of the thinnest layer, out of the melted-laminated-body-constituting individual layers from which the skin layers are removed, and the thickness $D_C$ of the thickest layer, out of the same, the ratio therebetween is not particularly limited. The ratio of $D_N:D_C$ is preferably from 1:99 to 50:50, more preferably from 2:98 to 50:50, even more preferably from 5:95 to 50:50, most preferably from 50:50 (1:1).

When the individual layers of the film of the present invention are equal in thickness to each other (the layer thickness per layer is constant), regarding the lower limit of the ratio of the layer thickness (A) per layer to the thickness (B) of the film of the present invention for the capacitor (=A/B or A÷B), A/B is preferably 0.0001 or more, more preferably 0.001 or more, even more preferably 0.003 or more since the advantageous effects of the present invention are more largely produced while the disturbance of the layer structure is restrained. For the same reason, regarding the upper limit of the ratio (=A/B or A÷B), A/B is preferably 0.15 or less, more preferably 0.1 or less, even more preferably 0.09 or less, in particular preferably 0.05 or less.

Unclear is the reason why when the layers made of thermoplastic resin compositions are plural layers (two or more layers, for example, 10 layers or more), the film for the capacitor is excellent in electrically insulating characteristics. As described above, however, the possibility that sites present in the individual layers where electric current flows easily (finely defective portions) are adjacent to each other is made small by the laminating of the plural layers, so that the substantially electrical insulation distance of the layers is increased. It is considered that the increase results in an improvement of the film for the capacitor in electrically insulating characteristics. The possibility that pinholes or other defects present in the individual layers are adjacent to each other is made small by the laminating of the plural layers, so that the proportion of defects in the thickness direction of the film is lowered. It is considered that the lowering results in an improvement of the film for the capacitor in electrically insulating characteristics. Additionally, the size of crystals of the thermoplastic resin is made very small, so that leakage current circumvents the crystals to flow. Thus, the substantially electrical insulation distance (distance over which the current flows) increases. It is also considered that the increase results in an improvement in the electrically insulating characteristics. Moreover, in the film of the present invention for the capacitor, the thermoplastic resin compositions or the thermoplastic resin composition fractions are in a melted state to be made into a lamination, so that many layers are formed; however, interfaces between the individual layers are maintained so that the thermoplastic resin compositions or the thermoplastic resin composition fractions are not mixed with each other. Thus, their molecular chains are oriented in the plane direction of the film, so that the orientation degree of the film rises. It is also considered that the rise results in an improvement in the electrically insulating characteristics.

The thickness (B) of the film of the present invention for the capacitor is usually from 1 to 35 µm, preferably from 1.0 to 30 µm, more preferably from 1.2 to 24 µm, even more preferably from 1.2 to 15 µm, even more preferably from 1.4 to 12 µm, in particular preferably from 1.6 to 10 µm. When the thickness (B) of the film of the present invention for the capacitor is in any one of the ranges, a capacitor including the film of the invention for the capacitor is desirable since the capacitor is excellent in balance between electrically insulating characteristics and capacitor capacity. The thickness (B) of the film of the invention for the capacitor is measurable through, for example, a paper piece thickness instrument or an optical microscope.

The thermoplastic resin composition preferably includes at least one thermoplastic resin selected from the group consisting of polyolefin resin, polyvinyl resin, polyester resin, polyether resin, and polyamide resin.

The polyolefin resin is a polymer produced by polymerizing an olefin, and is preferably a polymer produced by polymerizing an olefin in which the number of carbon atoms is preferably from 2 to 20, more preferably from 2 to 10, even more preferably from 3 to 6. Examples of the polyolefin resin include polyethylene resin, polypropylene resin, poly(1-butene) resin, polyisobutene resin, poly(1-pentene) resin, and poly(4-methylpentene-1) resin. Out of such polyolefin resins, polypropylene resin is preferred since the resin can gain high electrically insulating characteristics for a film for a capacitor, and is excellent in industrial economy.

The polyvinyl resin is a polymer produced by polymerizing a vinyl monomer other than any olefin, this vinyl monomer being a monomer in which a polar group or an aromatic group is bonded directly to its a position. Examples of the polyvinyl resin include polyvinyl acetate resin, polystyrene resin, polyvinyl chloride resin, polyvinylidene chloride resin, polymethyl methacrylate resin, and polyvinyl alcohol resin. Out of such polyvinyl resins, polystyrene resin is preferred since the resin can gain high electrically insulating characteristics for a film for a capacitor, and is excellent in industrial economy.

The polyester resin is a polymer having, in a main chain thereof, ester bonds. Examples of the polyester resin include polyethylene terephthalate resin, polyethylene naphthalate resin, polybutylene terephthalate resin, polyphenylene sulfide resin, polycarbonate resin, and polylactic acid resin. Out of such polyester resins, polyethylene terephthalate resin is preferred since the resin can gain high electrically insulating characteristics for a film for a capacitor, and is excellent in industrial economy.

The polyether resin is a polymer having, in a main chain thereof, ether bonds. Examples of the ether resin include polyethylene oxide resin, polyacetal resin, polyetherketone resin, polyetheretherketone resin, and polyetherimide resin.

The polyamide resin is a polymer having, in a main chain thereof, amide bonds. Examples of the polyamide resin include nylon 6 resin, nylon 46 resin, nylon 66 resin, nylon 69 resin, nylon 610 resin, nylon 612 resin, nylon 116 resin, nylon 4 resin, nylon 7 resin, nylon 8 resin, nylon 11 resin, and nylon 12 resin.

About the thermoplastic resin constituting the thermoplastic resin composition in the present invention, one thermoplastic resin species may be used, or two or more thermoplastic resin species may be used in combination. Out of the above-mentioned thermoplastic resins, preferred is one or more selected from the group consisting of polyolefin resin, polyvinyl resin and polyester resin, more preferred is one or more selected from the group consisting of polyolefin resin, polystyrene resin and polyester resin, and even more preferred is one or more selected from the group consisting of polyolefin resin, polystyrene resin and polyethylene terephthalate resin since the resin(s) can gain high electrically insulating characteristics for a film for a capacitor, and is excellent in industrial economy. Polyolefin resin is particularly preferred from the viewpoint of a small change rate in the capacity of the resultant capacitor in accordance with temperature. Polypropylene is especially preferred from the viewpoint of an excellent dielectric loss tangent property thereof.

The plural layers constituting the film of the present invention for capacitor may be made of a single thermoplastic resin composition, or plural thermoplastic resin compositions. The respective thermoplastic resin compositions contained in the individual layers included in the film of the invention for the capacitor may be the same in the entire layers, or may be different from each other in accordance with the layers. By selecting thermoplastic resin species in the thermoplastic resin composition(s) in the layers constituting the film of the invention for the capacitor, the oxygen gas permeability coefficient (Cmu), the Cmo/Cmu ratio, and other factors of the film for the capacitor are adjustable.

When the film for the capacitor is subjected to an orienting step, the weight-average molecular weight (Mw) and the molecular weight distribution (Mw/Mn) of the thermoplastic resin are not particularly limited as far as the control of the thickness of the film is easy.

In the present invention, the weight-average molecular weight (Mw) and the number-average molecular weight (Mn) of the thermoplastic resin are measurable by a gel permeation chromatographic (GPC) method. A GPC machine used in the GPC method is not particularly limited, and may be, for example, a commercially available high-temperature type GPC analyzer capable of analyzing the molecular weight of a thermoplastic resin, such as a differential refractometer (RI) built-in type GPC analyzer, HLC-8121 GPC-HT, manufactured by Tosoh Corp. In the case of, for example, a polyolefin resin, three columns TSK gel GMHHR-H (20) HT manufactured by Tosoh Corp., and connected to each other are used as GPC columns, the temperature of the columns are set to 140° C., and further trichlorobenzene is used as an eluent to make a measurement at a flow rate of 1.0 mL/minute. Usually, a standard polystyrene is used to prepare a calibration curve, and the weight-average molecular weight (Mw) and the number-average molecular weight (Mn) of the polyolefin resin are obtained in terms of those of the polystyrene. In the case of a polystyrene resin, four columns TSK gel Super H2500 manufactured by Tosoh Corp., and connected to each other are used as GPC columns, the temperature of the columns is set to 40° C., and further THF is used as an eluent to make a measurement at a flow rate of 0.5 mL/minute. Usually, a standard polystyrene is used to prepare a calibration curve, and the weight-average molecular weight (Mw) and the number-average molecular weight (Mn) of the polyolefin resin are obtained in terms of those of the polystyrene. Usually, a standard PMMA is used to prepare a calibration curve, and the weight-average molecular weight (Mw) and the number-average molecular weight (Mn) of the polystyrene are obtained in terms of those of PMMA. The molecular weight distribution (Mw/Mn) can be calculated out as the ratio of the weight-average molecular weight (Mw) to the number-average molecular weight (Mn), i.e., the "weight-average molecular weight (Mw)"/"number-average molecular weight (Mn)" ratio. In accordance with the species of the thermoplastic resin, the weight-average molecular weight (Mw) and the number-average molecular weight (Mn) of the thermoplastic resin may be calculated out by, for example, a measurement of the viscosity thereof. In the case of, for example, a polyethylene terephthalate resin, which is one polyester resin, the molecular weights thereof can be calculated out by a measurement of the intrinsic viscosity (IV value) thereof. The viscosity measurement can be made in accordance with JIS K7367.

When the thermoplastic resin is a polypropylene, this polypropylene may be a homopolymer, which is obtained by polymerizing only propylene, or may be a copolymer, which is obtained by polymerizing propylene with another monomer.

When the thermoplastic resin is a polypropylene, the weight-average molecular weight (Mw) of this polypropylene is preferably from 250000 to 450000 both inclusive. The use of such a polypropylene is preferred since at the time of subjecting a film of the resin to an orienting step, the film can gain an appropriate resin fluidity so that the thickness of the film is easily controlled and further a thickness unevenness of the film is not easily generated. The weight-average molecular weight (Mw) of the polypropylene is more preferably 280000 or more, even more preferably 300000 or more from the viewpoint of a thickness evenness, mechanical properties, and thermomechanical properties, and other factors of the polypropylene. Based upon considerations of fluidity and orientation characteristics of the resin film when from this film the film for the capacitor is obtained, the weight-average molecular weight (Mw) of the polypropylene is more preferably 400000 or less.

About the polypropylene, the molecular weight distribution (Mw/Mn) thereof is preferably from 6 to 12 both inclusive. The molecular weight distribution (Mw/Mn) is more preferably 7 or more, even more preferably 7.5 or more. The molecular weight distribution (Mw/Mn) is more preferably 11 or less, even more preferably 10 or less. The use of such a polypropylene is preferred since at the time of subjecting a film of the resin to an orienting step, the resin can gain an appropriate resin fluidity and a film for a capacitor that has no thickness-unevenness is easily gained. Such a polypropylene is also preferred from the viewpoint of the voltage endurance of the resultant capacitor.

Examples of the homopolymer of propylene include isotactic polypropylene, and syndiotactic polypropylene. The copolymer made from propylene and another monomer is, for example, a copolymer of a polypropylene and a polyethylene.

The polypropylene is preferably isotactic polypropylene, more preferably isotactic polypropylene obtained by homopolymerizing a polypropylene in the presence of an olefin-polymerizing catalyst from the viewpoint of the heat resistance thereof.

The polypropylene preferably has a mesopentad fraction ("mmmm") of 94.0% or more and less than 98.0%. The mesopentad fraction is more preferably from 95.0 to 97.0% both inclusive. When the thermoplastic resin is such a polypropylene, the crystallinity of the resin is appropriately improved by an appropriately high stereoregularity thereof, so that the resultant capacitor is improved in voltage endurance while at the time of shaping the resin into an unoriented film, the film can gain desired orientation characteristics by an appropriate solidifying (crystallizing) rate thereof.

The mesopentad fraction ("mmmm") of a resin is an index of the stereoregularity thereof that can be obtained through high-temperature nuclear magnetic resonance (NMR) measurement. Specifically, the measurement can be made using, for example, a high-temperature type Fourier transformation nuclear magnetic resonance apparatus (high-temperature FT-NMR), JNM-ECP 500, manufactured by JEOL Ltd. A nucleus to be measured is $^{13}C$ (at 125 MHz). The measuring temperature is 135° C., and a solvent to be used may be o-dichlorobenzene (ODCB: a mixed solvent of ODCB and deuterated ODCB (mixing ratio=4/1). The measuring method using the high-temperature NMR can be performed with reference to a method described in, for example, "Polymer Analysis Handbook, New Version, p. 610, edited by The Japan Society for Analytical Chemistry, Polymer Analysis Research Social Gathering, and published by Kinokuniya Co., Ltd. in 1995".

The measuring mode may be single-pulse proton broad band decoupling. The pulse width may be 9.1 μsec (45° pulse); the pulse interval, 5.5 sec; and the cumulative number, 4500. The shift standard may be $CH_3$ (mmmm)

=21.7 ppm. The mesopentad fraction is calculated out in the unit of percentage (%), using the intensity integrated value of individual signals each originating from a combination (such as mmmm or mrrm) which a pentad has. About the assignment of each of the signals, which originates from, for example, mmmm or mrrm, it is allowable to refer to the description of spectra in, for example, "T. Hayashi et al., Polymer, vol. 29, p. 138 (1988)".

The mesopentad fraction, which represents the stereoregularity, is calculated out in the unit of percentage (%) on the basis of the integrated value of individual signals each originating from a combination (such as mmmm or mrrm) of one or more identical-direction-arranged diads, which is/are (each) "meso (m)", and/or one or more different-direction-arranged diads, which is/are (each) "racemo (r)", that a pentad has. A signal originating from each of mmmm, mrrm, and others can be assigned with reference to "T. Hayashi et al., Polymer, vol. 29, p. 138 (1988)" and others.

When the thermoplastic resin is a polystyrene, this polystyrene resin may be a homopolymer obtained by polymerizing only styrene, or may be a copolymer obtained by copolymerizing styrene with another monomer. The monomer may be, for example, a (meth)acrylate, vinyl acetate or a polyolefin.

When the thermoplastic resin is a polystyrene, this polystyrene resin preferably has a weight-average molecular weight (Mw) from 100000 to 1000000 both inclusive. The use of such a polystyrene resin is preferred since at the time of subjecting a film of the resin to an orienting step, the resin can gain an appropriate resin fluidity so that the thickness of the resultant film can easily be controlled. Moreover, the use is preferred since a thickness unevenness is not easily generated in the film. The weight-average molecular weight (Mw) of the polystyrene resin is more preferably 120000 or more from the viewpoint of the thickness evenness, mechanical properties and thermomechanical properties of the film for the capacitor, and others. Based upon considerations of fluidity of the resin and the orientation characteristics thereof when this film is used to obtain a capacitor, the weight-average molecular weight (Mw) of the polystyrene resin is more preferably 200000 or less.

The polystyrene resin preferably has a molecular weight distribution (Mw/Mn) from 1.0 to 5.0 both inclusive. The molecular weight distribution (Mw/Mn) is more preferably 1.2 or more, even more preferably 1.6 or more. The molecular weight distribution (Mw/Mn) is more preferably 4.5 or less, even more preferably 4.0 or less. The use of such a polystyrene resin is preferred since at the time of subjecting a film of the resin to an orienting step, the resin can gain an appropriate resin fluidity so that a film for a capacitor that has no thickness unevenness can easily be obtained.

When the thermoplastic resin is a polyethylene terephthalate resin, this polyethylene terephthalate resin preferably has, in an intrinsic viscosity measurement thereof, an IV value from 0.4 to 1.4 dL/g both inclusive. The use of such a polyethylene terephthalate resin is preferred since at the time of subjecting a film of the resin to an orienting step, the resin can gain an appropriate resin fluidity so that the thickness of the resultant film is easily controlled. Moreover, the use is preferred since a thickness unevenness of the film is not easily generated. The IV value of the polyethylene terephthalate resin is more preferably 0.5 dL/g or more from the viewpoint of the thickness evenness, mechanical properties and thermomechanical properties of the film for the capacitor, and others. Based on considerations of fluidity of the resin and the orientation characteristics thereof when this is to be used to obtain a film for a capacitor, the IV value of the polyethylene terephthalate resin is more preferably 0.9 dL/g or less.

In the present invention, the thermoplastic resin composition may include at least one additive besides the thermoplastic resin. The additive is not particularly limited as far as the additive is an additive used generally for thermoplastic resin. Examples of the additive include stabilizers such as an antioxidant, a chlorine absorber and an ultraviolet absorbent, a lubricant, a plasticizer, a flame retardant, an antistatic agent, a colorant, and a nucleating agent. Such an additive may be added to the thermoplastic resin composition as far as the additive does not damage the advantageous effects of the invention.

The antioxidant is not particularly limited as far as the antioxidant is an antioxidant used ordinarily for thermoplastic resin. The antioxidant is generally used for two purposes. One of the purposes is to restrain the resin from being thermally deteriorated and oxidatively deteriorated in an extruding kneader. The other purpose is to contribute to a restraint of a deterioration of the film capacitor by a long-term use thereof, and an improvement of the capacitor in performances. The antioxidant for restraining the resin from being thermally deteriorated and oxidatively deteriorated in an extruding kneader is also called a "primary agent". The antioxidant contributing to the improvement of the capacitor in performances is also called a "secondary agent". For these two purposes, two antioxidant species that are a primary agent and a secondary agent may be used. For the two purposes, a single antioxidant species may be used.

When the two antioxidant species are used, the thermoplastic resin may contain, as the primary agent, for example, 2,6-di-tert-butyl-p-cresol (general name: BHT) in a proportion of about 1000 to 4000 ppm by mass of the thermoplastic resin (the base amount thereof: 100 parts by mass). Almost all of the antioxidant for this purpose is consumed in the extruding kneader so that the antioxidant hardly remains in the produced and shaped film (the remaining proportion is generally less than 100 ppm). As the primary agent, a single compound may be used, or two or more compounds may be used in combination.

The secondary agent may be a hindered phenolic antioxidant having a carbonyl group, or a phosphorus-containing antioxidant. The carbonyl-group-having hindered phenolic antioxidant usable in the present invention is not particularly limited, and examples thereof include triethylene glycol-bis[3-(3-tert-butyl-5-methyl-4-hydroxyphenyl)propionate] (trade name: IRGANOX 245), 1,6-hexanediol-bis[3-(3,5-di-tert-butyl-4-hydroxyphenyl)propionate] (trade name: IRGANOX 259), pentaerythritol/tetrakis[3-(3,5-di-tert-butyl-4-hydroxyphenyl)propionate] (trade name: IRGANOX 1010), 2,2-thio-diethylene bis[3-(3,5-di-tert-butyl-4-hydroxyphenyl)propionate] (trade name: IRGANOX 1035), octadecyl-3-(3,5-di-tert-butyl-4-hydroxyphenyl)propionate (trade name: IRGANOX 1076), and N,N'-hexamethylenebis(3,5-di-tert-butyl-4-hydroxy-hydrocinnamide) (trade name: IRGANOX 1098). The phosphorus-containing antioxidant is not particularly limited, and examples thereof include tris(2,4-di-t-butylphenyl)phosphite (trade name: IRGAFOS 168), and bis(2,4-di-t-butyl-6-methylphenyl)ethyl phosphite (trade name: IRGAFOS 38). When the thermoplastic resin is polypropylene, most preferred is pentaerythrityl/tetrakis[3-(3,5-di-tert-butyl-4-hydroxyphenyl)propionate], which is high in molecular weight, rich in compatibility with polypropylene, low in volatility and excellent in heat resistance. As the secondary agent, a single compound may be used, or two or more compounds may be used in combination.

The carbonyl-group-having hindered phenolic antioxidant is included in the thermoplastic resin composition in an amount preferably from 2000 to 7000 ppm both inclusive, more preferably from 3000 to 7000 ppm both inclusive by mass of the thermoplastic resin (the base amount thereof: 100 parts by mass), considering that the antioxidant is consumed to no small extent in the extruding kneader.

When the thermoplastic resin contains no primary agent, the carbonyl-group-having hindered phenolic antioxidant is usable in a larger proportion. In this case, the consumed amount of the carbonyl-group-having hindered phenolic antioxidant increases in the extruding kneader. Thus, the carbonyl-group-having hindered phenolic antioxidant is included in the thermoplastic resin composition in an amount preferably from 3000 to 8000 ppm both inclusive by mass of the thermoplastic resin (the base amount thereof: 100 parts by mass).

The chlorine absorber is not particularly limited as far as the chlorine absorber is a chlorine absorber used ordinarily for thermoplastic resin. The chlorine absorber is, for example, a metal soap such as calcium stearate.

The ultraviolet absorbent is not particularly limited as far as the ultraviolet absorbent is an ultraviolet absorbent used ordinarily for thermoplastic resin. Examples of the ultraviolet absorbent include benzotriazole (such as Tinuvine 328 manufactured by the BASF), benzophenone (such as Cysorb UV-531 manufactured by Cytec Industries Inc.), and hydroxybenzoate (such as UV-CHEK-AM-340 manufactured by Ferro Corp.).

The lubricant is not particularly limited as far as the lubricant is a lubricant used ordinarily used for thermoplastic resin. Examples of the lubricant include primary amides (such as stearic acid amide), secondary amides (such as N-stearylstearic acid amide), and ethylenebisamides (such as N,N'-ethylenebisstearic acid amide).

The plasticizer is not particularly limited as far as the plasticizer is a plasticizer used ordinarily for thermoplastic resin. Examples of the plasticizer include PP random copolymer, and acrylic polymer.

The flame retardant is not particularly limited as far as the flame retardant is a flame retardant used ordinarily for thermoplastic resin. Examples of the flame retardant include halogenated compounds, aluminum hydroxide, magnesium hydroxide, phosphoric acid salts, borates, and antimony oxides.

The antistatic agent is not particularly limited as far as the antistatic agent is an antistatic agent used ordinarily used for thermoplastic resin. Examples of the antistatic agent include glycerin monoesters (such as glycerin monostearate), and ethoxylated secondary amines.

The colorant is not particularly limited as far as the colorant is a colorant used ordinarily used for thermoplastic resin. Examples of the colorant include colorants within a scope from cadmium- and chromium-containing inorganic compounds to azo, and quinacridone organic pigments.

In the present invention, the film for the capacitor contains one or more carbonyl-group-having hindered phenolic antioxidants (secondary agents) in a range preferably from 1000 to 6000 ppm both inclusive, more preferably from 1500 to 6000 ppm by mass of the thermoplastic resin (the base amount thereof: 100 parts by mass) to be restrained from suffering from a deterioration advancing over time by being used over a long term.

Preferred is a film capacitor into which the carbonyl-group-having hindered phenolic antioxidant, which is good at a molecular level in compatibility with thermoplastic resin, is incorporated in an amount in an optimally specified range since the capacitor keeps a high voltage endurance while the film capacitor is not lowered in electrostatic capacity (a deterioration of the film capacitor does not advance) over a long term in a life-promoting test at a very high temperature, so as to be improved in resistance against being used over a long term.

The thermoplastic resin in the present invention can be produced, using a method known in the prior art. In the case of, for example, a polyolefin resin such as polypropylene, a polymerization method therefor is, for example, a gas-phase polymerization, bulk polymerization or slurry polymerization method. The polymerization may be one-stage polymerization, in which a single polymerization reactor is used, or multistage polymerization, in which two or more polymerization reactors are used. The polymerization may be performed in the state that hydrogen or a comonomer is added as a molecular weight adjustor to a reactor. A catalyst for the polymerization may be a Ziegler-Natta catalyst, which is known in the prior art. The polymerization catalyst may contain a co-catalyst or a donor. The molecular weight, the molecular weight distribution, the stereoregularity and other factors of the resultant polymer are controllable by adjusting the polymerization catalyst, and other polymerization conditions appropriately. The polymerization catalyst may be a metallocene catalyst. In this case, the molecular weight, the molecular weight distribution, the stereoregularity and other factors of the produced polymer are easily controlled. In the case of a polystyrene resin, a polymerization method therefor is, for example, radical polymerization, anion polymerization or coordination polymerization. Using an initiator and a catalyst optionally to polymerize styrene, the polystyrene resin can be obtained. When the radical polymerization is performed, a well-known polymerization method, such as suspension polymerization method or seed polymerization method, may be performed. In the case of a polyester resin, the resin can be produced by polycondensation reaction, using a catalyst such as an antimony compound optionally. The polycondensation may also be performed in the presence of a co-catalyst. About any resin, the polymerization may be one-stage polymerization, in which a single polymerization reactor is used, or a multistage polymerization, in which two or more polymerization reactors are used.

The method for adjusting the molecular weight distribution of the thermoplastic resin is, for example, a method of adjusting conditions for the polymerization to adjust the molecular weight distribution, a method of using a decomposer, a method of subjecting high-molecular-weight ones out of components of the resin to selectively decomposing treatment, or a method of blending resins different from each other in molecular weight with each other.

When the molecular weight distribution is adjusted in accordance with the polymerization conditions, it is preferred to use a polymerization catalyst that will be described later since the molecular weight distribution and the configuration of molecular weights of the resin are easily adjustable. When polypropylene is obtained by a multistage polymerization reaction, a method as described hereinafter can be given as an example. The polymerization reaction is conducted in plural reactors composed of a polymerizing reactor for a high-molecular-weight component and a polymerizing reactor for a low-molecular-weight component in the presence of a catalyst. The plural reactors are usable, for example, in series or in parallel. Initially, propylene and a catalyst are supplied into one of the reactors. These components are mixed with a molecular weight adjustor, for example, hydrogen in an amount necessary for causing the molecular weight of the resultant polymer to reach to a required molecular weight. In this way, a first polymerization reaction is conducted. When the polymerization is, for example, slurry polymerization, the reaction temperature is from about 70 to 100° C., and the retention period is from about 20 to 100 minutes. A product based on the first polymerization reaction, an additional propylene, the same or another catalyst, and a molecular weight adjustor are supplied, one after another or continuously, to next one of the reactors to make an adjustment to obtain a product lower or higher in molecular weight than the product based on the first polymerization reaction. In this way, a second polymerization reaction is conducted. The molecular weight distribution of the products is adjustable by adjusting the product yield (production quantity) based on the first polymerization reaction, and that based on the second polymerization reaction.

In the case of producing a polyolefin resin such as polypropylene, a catalyst therefor is preferably a general Ziegler-Natta catalyst or metallocene catalyst. In the case of producing the thermoplastic resin by radical polymerization, an additive such as a polymerization controller may be added to the polymerizing-system. A catalyst used therein may contain a co-catalyst component or a donor. In the case of producing a polyester resin such as polyethylene terephthalate resin, a condensing agent such as a carbodiimide compound may be used. An appropriate adjustment of the catalyst and the polymerization conditions makes it possible to control the molecular weight distribution.

In the case of adjusting the content by percentage of the low-molecular-weight component by the blend of resins, the melt flow rate (MFR) of each of the resins may be used as an index of the above-mentioned average molecular weight. In this case, the absolute value of the difference in MFR between the resin as a main component and the resin added thereto is preferably from about 0 to 10 g/10-minutes, more preferably from about 0 to 5 g/10-minutes when the resin as the main component is polypropylene resin. When the resin as the main component is polystyrene resin, the value is preferably from about 0 to 7 g/10-minutes, more preferably from about 0 to 5 g/10-minutes.

In the present invention, the total content of ashes resulting from residues of the polymerization catalyst and others that are contained in raw materials of the thermoplastic resin is preferably as small as possible to improve the thermoplastic resin in electrical properties, particularly, breakdown strength. The total ash content is preferably 100 ppm or less, more preferably 50 ppm or less, even more preferably 40 ppm or less, in particular preferably 30 ppm or less, especially preferably 20 ppm or less, exceedingly preferably 10 ppm or less by mass of the thermoplastic resin (the base amount thereof: 100 parts by mass). The total ash content is usually 0 ppm or more.

The film of the present invention for the capacitor may have, over one or each of its two surfaces, a different layer. The different layer may be a layer made of, for example, the following: a polyolefin such as polyethylene, polypropylene or a norbornene type polymer; a polyester such as polyethylene terephthalate; a polyamide such as a nylon; a polyvinyl alcohol type polymer such as ethylene/vinyl alcohol copolymer; a polystyrene; an acrylic polymer such as a polymethacrylate, or a polyacrylate; a polyether such as polyethylene oxide; a cellulose ester; a polycarbonate; or a polyurethane. The different layer may be laid as a skin layer.

The process for producing the film of the present invention for the capacitor is not particularly limited, and is, for example, a method described below. The film of the invention for the capacitor can be suitably produced by a process including the following steps:

a melting step of melting a thermoplastic resin composition to obtain a melted resin composition, a laminating step of laminating the melted resin composition into plural laminated layers (two or more layers, for example, 10 layers or more) to obtain a melted laminated body, and a co-extruding step of co-extruding the melted laminated body to obtain the target film.

In the melting step, a thermoplastic resin and various additives to be optionally added, such as an antioxidant, are melted and kneaded to obtain a melted resin composition. This melting step may be performed by the following method:

(1) a method of kneading the thermoplastic resin and the various additives to produce thermoplastic resin composition pellets, and using a kneader to melt and knead the thermoplastic resin composition pellets;

(2) a method of kneading the thermoplastic resin and the various additives preliminarily to produce masterbatch pellets, and using a kneader to melt and knead the masterbatch pallets and thermoplastic resin pellets; or (3) a method of dry-blending the thermoplastic resin with the various additives without making these raw materials into a masterbatch, and using a kneader to melt and knead the resultant blend.

The use of the method (1) or (2) is preferred since the environment of the vicinity of the extruding kneader can be kept clean. A blending machine at the time of the dry-blending may be a batch type machine such as a tumbler or a wing mixer, or a continuous type measuring mixer.

The melting and kneading temperature is varied in accordance with the species of the thermoplastic resin, and is, for example, from 170 to 340° C., preferably from 185 to 320° C., more preferably from 200 to 310° C. In the case of polypropylene resin, the temperature is usually from 200 to 300° C., preferably from 200 to 250° C. In the case of polystyrene resin, the temperature is usually from 170 to 340° C., preferably from 180 to 330° C. In the case of polyethylene terephthalate resin, the temperature is usually from 250 to 320° C., preferably from 270 to 310° C. When the melting and kneading temperature is in any one of the ranges, the film for the capacitor is not easily lowered in electrically insulating characteristics by a thermal deterioration of the thermoplastic resin, and further the kneading is sufficiently attained so that components of the film for the capacitor can be evenly mixed with each other. In order to restrain a deterioration of the resin in the kneading, the inside of the extruding kneader may be purged with an inert gas such as nitrogen.

The extruding kneader is not particularly limited. A monoaxial screw type, a biaxial screw type or a multiaxial screw type may be appropriately used. In the case of a biaxial type or higher-axial screw type, a kneader of any one of same-direction rotatable and different-direction rotatable kneading types may be used by adjusting the kneading conditions not to increase a deterioration of the resin. It is preferred to use a monoaxial screw type, or a same-direction rotatable biaxial screw type since the resin is not thermally deteriorated with ease.

Before the thermoplastic resin is melted and kneaded, water contained in the thermoplastic resin may be removed. The method for the water removal is not particularly limited, and is, for example, a thermal treatment. From the viewpoint of a sufficient removal of water, the temperature for this thermal treatment is, for example, 100° C. or higher, preferably 130° C. or higher, more preferably 150° C. or higher. From the viewpoint of a restraint of the thermal decomposition of the thermoplastic resin, the temperature is, for example, 350° C. or lower. The thermal treatment period is, for example, 1 hour or longer, preferably 2 hours or longer from the viewpoint of a sufficient removal of water. From the viewpoint of a restraint of the thermal decomposition of the thermoplastic resin, the period is usually 24 hours or shorter, for example, 10 hours or shorter. This treatment makes it possible to restrain the thermoplastic resin (for example, polyester resin) from being hydrolyzed by water.

In the laminating step, the melted resin composition obtained in the melting step is laminated into plural laminated layers to obtain a melted laminated body. In the laminating step, the melted resin composition is laminated usually into 2 layers or more, preferably into 10 layers or more, more preferably into 12 layers or more, even more preferably into 40 layers or more, in particular preferably into 80 layers or more, exceedingly preferably into 160 layers or more, for example, 200 layers or more. In the laminating step, it is desired to laminate the melted resin composition into layers the number of which is the above-mentioned lower limit value or more since the resultant film for the capacitor is excellent in electrically insulating characteristics. In the laminating step, the number of the laminated layers is not particularly limited, and is, for example, 3000 layers or less.

In the laminating step, the method for laminating the melted resin composition into layers to obtain a melted laminated body is not particularly limited. The melted laminated body can be obtained, for example, by using a multi-manifold or feed block to co-extrude the composition. Out of these instruments, a feed block is preferably used since the producing facilities do not become complicated, and the producing efficiency is good.

When a multi-manifold is used to perform the laminating step, the used multi-manifold is a multi-manifold having manifolds the number of which is equal to or more than a desired number of the layers. The melted resin composition introduced into the multi-manifold is divided into the individual manifolds and caused to flow so that the composition is spread into the width direction of the multi-manifold. At this time, it is preferred that the respective shapes of the individual manifolds, as well as the respective sectional areas thereof, are wholly equal to each other. When the respective shapes of the individual manifolds, as well as the respective sectional areas thereof, are wholly equal to each other, the respective thicknesses of individual layers included in the resultant film for the capacitor become equal to each other. Thereafter, the respective melted resin composition fractions or branches flowing in the individual manifolds join each other in the vicinity of one of the ends of the multi-manifold, so as to be laminated onto each other. As a result, a melted laminated body is obtained which has layers the number of which is a desired number.

When a feed block is used to perform the laminating step, the melted resin composition is introduced into the feed block. The melted resin composition introduced into the feed block is initially passed into a multi-plier block. In this multi-plier block, divided flow channels are arranged the number of which is m wherein m is an integer of 2 or more to divide the melted resin composition. Thereafter, the divided melted resin composition fractions, the number of which is m, are laminated onto each other in the thickness direction, and spread into the width direction. In this way, a melted laminated body having layers the number of which is m is shaped.

The melted laminated body, in which the layers, the number of which is m, are laminated onto each other, is further passed through another multiplier block having divided flow channels the number of which is n wherein n is an integer of 2 or more. Consequently, a melted laminated body having "m×n" layers can be shaped. Furthermore, when the same operation is repeated, a melted laminated body can be obtained which has a desired number of layers.

The individual layers constituting the film of the present invention for the capacitor may be made (or composed) of the same thermoplastic resin composition, or different thermoplastic resin compositions. When the individual layers are made of the same thermoplastic resin composition, or different thermoplastic resin compositions, fractions of the thermoplastic resin composition(s) may be laminated, in a melted state, onto each other before the composition(s) is/are introduced into the above-mentioned feed block. For example, when fractions of the same thermoplastic resin composition, or fractions of two different thermoplastic resin compositions (for example, thermoplastic resin composition fractions "a" and ones "b") are laminated into plural laminated layers, one of the thermoplastic resin composition fractions "a" and one of those "b" may be laminated, in a melted state, onto each other before introduced into the feed block. In this case, by introducing the resultant into the feed block, a melted laminated body is obtained in which the thermoplastic resin composition fractions "a" and the thermoplastic resin composition fractions "b" are alternately laminated into layers the number of which is "2×m". When fractions of the same thermoplastic resin composition, or fractions of three different thermoplastic resin compositions (for example, thermoplastic resin composition fractions "a", ones "b" and ones "c") are laminated into plural laminated layers, a melted laminated body is obtained which has layers the number of which is "3×m". These individual layers come to have a structure in which combinations each composed of one of the thermoplastic resin composition fractions "a", one of those "b" and one of those "c" are laminated onto each other.

A different melted resin composition may be laminated onto the melted laminated body obtained using the multi-manifold or the feed block to form a skin layer onto the laminated body. The formation of the skin layer makes it possible to restrain any turbulent flow of the melted resin composition.

In the present invention, it is preferred that the entire layers of the melted laminated body are made of the same thermoplastic resin composition since the respective thermoplastic resin fractions in the individual layers are equal in fluidity to each other, whereby thickness unevenness can be made small between the individual layers in the melted laminated body. Moreover, it is preferred in the melted laminated body that layers wholly having the same thickness are laminated onto each other since a turbulent flow of the melted resin composition can be made small at the time of laminating these layers onto each other. However, even when layers different in thickness from each other are laminated onto each other, the advantageous effects of the present invention are not damaged. The thickness of each of the layers is adjustable by adjusting, for example, the extruding rate (supplying rate) of the melted resin composition when the melted resin composition is laminated into plural laminated layers.

It is preferred to fit a heating means, such as a heater, to each of the multi-manifold and the feed block used in the present invention. The position of the manifold or block where this heating means is to be fitted is not particularly limited as far as the means can heat the melted resin composition.

At this time, the heating temperature is varied in accordance with the species of the thermoplastic resin, and is usually from 170 to 340° C., preferably from 175 to 320° C., more preferably from 180 to 310° C. In the case of polypropylene, the temperature is usually from 200 to 300° C., preferably from 200 to 250° C. In the case of polystyrene resin, the temperature is usually from 170 to 340° C., preferably from 180 to 330° C. In the case of polyethylene terephthalate resin, the temperature is usually from 250 to 320° C., preferably from 270 to 310° C. When the melting and kneading temperature is in any one of the ranges, the film for the capacitor is not easily lowered in electrically insulating characteristics by a thermal deterioration of the thermoplastic resin, and further the kneading is sufficiently attained so that components constituting the film for the capacitor can be evenly mixed with each other.

In the co-extruding step, the melted laminated body obtained in the laminating step is ejected to obtain a film. The melted laminated body is ejected from a die (preferably a T die) connected to the multi-manifold, the feed block or the like to be shaped into the film. The film is cooled and solidified on at least one metallic drum, thereby making it possible to form an unoriented cast sheet. The temperature of the metallic drum (casting temperature) depends on the species of the thermoplastic resin, and is usually from 15 to 150° C., more preferably from 20 to 140° C., even more preferably from 25 to 120° C., in particular preferably from 30 to 110° C. In the case of polypropylene resin, the casting temperature is usually from 30 to 140° C., preferably from 40 to 120° C., more preferably from 50 to 100° C., even more preferably from 60 to 80° C. In the case of polystyrene resin, the casting temperature is usually from 30 to 150° C., preferably from 40 to 130° C., more preferably from 50 to 110° C., even more preferably from 60 to 90° C. In the case of polyethylene terephthalate resin, the casting temperature is usually from 15 to 150° C., preferably from 20 to 130° C., more preferably from 25 to 100° C., even more preferably from 30 to 70° C. The thickness of the cast sheet depends on the species of the thermoplastic resin, and is usually from 8 to 2000 µm, preferably from 10 to 1800 µm, more preferably from 12 to 1600 µm, even more preferably from 14 to 1400 µm, in particular preferably from 16 to 1200 µm. In the case of polypropylene resin, the thickness of the cast sheet is usually from 40 to 2000 µm, preferably from 50 to 1800 µm, more preferably from 60 to 1400 µm, even more preferably from 70 to 900 µm, in particular preferably from 80 to 800 µm, still more preferably from 90 to 600 µm. In the case of polystyrene resin, the thickness is usually from 8 to 400 µm, preferably from 10 to 350 µm, more preferably from 12 to 300 µm, even more preferably from 12 to 200 µm, in particular preferably from 14 to 150 µm, still more preferably from 16 to 120 µm. In the case of polyethylene terephthalate resin, the thickness is usually from 8 to 400 µm, preferably from 10 to 350 µm, more preferably from 12 to 300 µm, even more preferably from 12 to 200 µm, in particular preferably from 14 to 150 µm, still more preferably from 16 to 120 µm.

The process for producing the film of the present invention for the capacitor may further include an orienting step of orienting the film (cast sheet). The orienting step may be performed by monoaxial or biaxial orientation. Based upon consideration of obtaining uniformity in thickness in the width direction thereof, the orienting step is preferably performed by biaxial orientation.

When the biaxial orientation is performed, the film (cast sheet) can be biaxially oriented in accordance with an ordinary method. During biaxial orientation, biaxial orientation is performed in which the film is oriented along two axes in the longitudinal and lateral directions. The method for the orientation may be a simultaneous or successive biaxial orientation method, and is preferably the successive biaxial orientation method. In the case of, for example, polypropylene, the successive biaxial orientation method includes the step of keeping the film initially at a temperature preferably from 100 to 180° C. (more preferably from 100 to 170° C., even more preferably from 120 to 165° C.), and passing the film between rolls having a velocity difference to stretch the film so as to cause increase in dimension by a factor of 3 to 7 in the flow direction. The method includes a subsequent step of introducing the oriented film into a tenter to be stretched so as to cause increase in dimension by a factor of 3 to 11 (for example, 5 to 10, preferably 6 to 9) in the width (lateral) direction at 160° C. or higher (for example, 170° C. or higher), subjecting the film to relaxation and thermal fixation, and winding up the film. The wound film is subjected to aging treatment in an atmosphere of, for example, about 20 to 45° C. temperature, and then the film can be cut into a desired product width. In the case of polystyrene resin, the successive biaxial orientation method includes the step of keeping the film at a temperature preferably from 100 to 140° C. (more preferably from 110 to 130° C., even more preferably from 115 to 120° C.), and passing the film between rolls having a velocity difference to stretch the film so as to cause increase in dimension by a factor of 2 to 7 (for example, 2.2 to 5, preferably 2.5 to 3.5) in the flow direction. The method includes a next step of introducing the oriented film into a tenter to be stretched so as to cause increase in dimension by a factor of 2 to 7 (for example, 2.2 to 5, preferably 2.5 to 3.5) in the width (lateral) direction at 100° C. or higher (for example, 110° C. or higher), subjecting the film to relaxation and thermal fixation, winding up the film, and then subjecting the film to aging treatment. In the case of polyethylene terephthalate resin, the successive biaxial orientation method includes the step of keeping the film at a temperature preferably from 60 to 170° C. (more preferably from 70 to 150° C., even more preferably from 75 to 130° C.), and passing the film between rolls having a velocity difference to stretch the film so as to cause increase in dimension by a factor of 2 to 7 (for example, 2.5 to 5, preferably 3 to 3.5) in the flow direction. The method includes a next step of introducing the oriented film into a tenter to be stretched so as to cause increase in dimension by a factor of 4 to 4.5 in the width (lateral) direction at a temperature from 180 to 220° C., subjecting the film to relaxation and thermal fixation, and then winding up the film.

Furthermore, while both edges of the film are fixed with, for example, clips, the film may be thermally treated to orient crystals of the film. The thermal treatment temperature and period are varied in accordance with the thermoplastic resin. The thermal treatment temperature is, for example, from 150 to 300° C., preferably from 180 to 280° C., more preferably from 200 to 260° C., and the thermal treatment period is, for example, from 1 second to 3 minutes, preferably from 5 seconds to 1 minute, more preferably from 10 to 40 seconds.

The thus obtained oriented film has a thickness ranging usually from 1 to 35 µm, preferably from 1 to 30 µm, more preferably from 1.2 to 24 µm, even more preferably from 1.4 to 12 µm, in particular preferably from 1.6 to 10 µm. When the thickness of the oriented film is in any one of the ranges, a capacitor including this film is desirable since the capacitor is excellent in balance between electrically insulating characteristics and capacitor capacity.

Through such an orienting step, the cast sheet becomes a film excellent in mechanical strength and rigidity, and further irregularities of its surfaces are also made clearer so that the film becomes an oriented film having surfaces finely roughened. An appropriate surface roughness is preferably given to the surfaces of the oriented film to improve the film in windability while making the resultant capacitor good in performances.

About the film of the present invention for the capacitor, the surface roughness of at least one of its surfaces is preferably as follows: the central line average roughness (Ra) thereof is from 0.01 to 0.20 μm both inclusive, and the maximum height (Rz, which is Rmax defined in the old JIS) thereof is from 0.1 to 1.5 μm both inclusive to roughen the surface to have fine irregularities. When Ra and Rz are in the respective preferred ranges, the surface can be a surface roughened to have fine irregularities. Thus, when the film is worked into a capacitor, winding wrinkles are not easily generated in a winding process for the element, so that the film can be favorably wound up. Furthermore, portions of the film can also evenly contact each other so that the resultant capacitor can be improved in voltage endurance, and long-term voltage endurance.

"Ra", and "Rz" (Rmax defined in the old JIS) are values measured by methods prescribed in, for example, JIS-B0601:2001, using a stylus type surface roughness meter (for example, a stylus type surface roughness meter with a diamond stylus), which is in general widely used. More specifically, "Ra" and "Rz" can be gained in accordance with a method prescribed in JIS-B0601:2001, using a three-dimensional surface roughness meter, SURFCOM 1400D-3DF-12 model, manufactured by Tokyo Seimitsu Co., Ltd.

The method for giving fine irregularities onto the surface of the film may be a known surface-roughening method that may be of various types, such as an embossing method or an etching method. When polypropylene is used as the thermoplastic resin, the following method is preferred out of such methods: a surface-roughening method making use of a β crystal, for which the incorporation of an impurity, and others are unnecessary. In general, the production proportion of the β crystal is controllable by changing the casting temperature and the casting speed. Moreover, the melting/transformation proportion of the β crystal is controllable by the roll temperature in the longitudinally orienting step. By selecting optimal production conditions about these two parameters in the production of the β crystal and the melting/transformation thereof, the film for the capacitor can gain a fine rough-surface property.

About the film obtained by the above-mentioned method, on one or each of its two surfaces may be laminated different layer(s). The method for the laminating of the different layer(s) is not particularly limited. The method is, for example, a method of applying a coating liquid containing a resin onto the film, and then drying or heating the resultant to form a layer of the resin; or a method of bonding a different-layer-corresponding layer (film) onto the film through an optionally used adhesive (for example, an acrylic adhesive, silicone-based adhesive or olefin-based adhesive). By the laminating of the different layer, adjustment can be made about the oxygen gas permeability coefficient (Cmu) of the resultant laminated film, and the Cmo/Cmu ratio and other factors of the film. The laminating of the different layer(s) may be performed before or after the biaxial orientation. When the laminating of the different layer(s) is performed before the biaxial orientation, at the time of the biaxial orientation the different layer(s) can also be oriented.

The film of the present invention for the capacitor may be subjected to corona discharge treatment on-line or off-line after the end of the orientation and thermal fixation step in order to heighten the film in adhesive property in a subsequent step such as a metal vaporizing step. The corona discharging treatment may be conducted by a known method. An atmosphere gas therefor is preferably air, carbon dioxide gas or nitrogen gas; or a mixed gas of two or more of these gases.

In another embodiment of the present invention, provided is a metallized polypropylene film for film capacitor in which metal vaporization is applied to one or each of the two surfaces of the above-mentioned biaxially oriented polypropylene film. In other words, the metallized polypropylene film of the present invention for film capacitor has a metal vapor deposition film on one or each of the two surfaces of the above-mentioned film. In the step of producing the metallized film, a metal vapor deposition film is formed on one or each of the two surfaces of the film for the capacitor. The method for laying the metal vapor deposition film onto the film for the capacitor is, for example, a vacuum evaporating method or sputtering method. The former method is preferred from the viewpoint of producing-performance and economy. When the metal vapor deposition film is laid by vacuum evaporation, a known manner is appropriately selected and performed, which is, for example, a crucible manner or a wire manner. Examples of a metal constituting the metal vapor deposition film include simple metals such as zinc, lead, silver, chromium, aluminum, copper and nickel; and any mixture or alloy composed of two or more metals selected from these metals. The metal constituting the metal vapor deposition film is preferably a simple metal selected from zinc and aluminum, or a metal mixture or alloy thereof from the viewpoint of environment, economy, and performances of the resultant film capacitor, particularly, the electrostatic capacity, insulation-resistance temperature-property and frequency property of the film capacitor, and others.

The membrane resistivity of the metal vapor deposition film (metal membrane) is from 1 to 150Ω/□ from the viewpoint of electrical characteristics of the resultant capacitor. From the viewpoint of self-healing property thereof, a higher value within this range is more desired. The membrane resistivity is more preferably 5Ω/□ or more, even more preferably 10Ω/□ or more. From the viewpoint of the safety of the capacitor, the membrane resistivity is more preferably 100Ω/□ or less, even more preferably 50Ω/□ or less, in particular preferably 20Ω/□ or less. The membrane resistivity of the metal vapor deposition film is measurable while the metal is deposited, using, for example, a two-terminal method known by those skilled in the art. The membrane resistivity of the metal vapor deposition film is adjustable by adjusting, for example, the power of the vaporization source to control the vaporization quantity of the metal. The above-mentioned range of the membrane resistivity of the metal vapor deposition film is a preferred range in the case of, for example, entire-surface vaporization of the metal, or the transfer of an especial margin. In the case of an oblique deposition method, the deposition may be performed while the thickness of the resultant deposited membrane is changed in accordance with membrane resistivities ranging from about 50 to 100Ω/□. The thickness of the metal film is not particularly limited, and is preferably from 1 to 200 nm.

When the metal vapor deposition film is formed on one or each of the surfaces of the film, it is preferred to vaporize no metal over a constant width from a single edge of the film to form an insulating margin to make the film into a capacitor when the film is wound up. Furthermore, in order to strengthen joint between the metallized film and a metallikon electrode, it is preferred to form a heavy edge structure at an edge of the film that is reverse to the insulating margin. The membrane resistivity of the heavy edge structure is usually from 2 to 8Ω/□, preferably from 3 to 6 Ω/□.

A pattern of the margin of the formed metal vapor deposition film is not particularly limited, and is preferably a pattern including the so-called especial pattern, such as a fishnet pattern or a T margin pattern from the viewpoint of the safety-keeping performance of the film capacitor. When the metal vapor deposition film is formed into the especial-margin-including pattern onto one or each surface of the surfaces of the film, the safety-keeping performance of the resultant film capacitor is improved so that the film capacitor can be favorably restrained from being broken or short-circuited. As the method for forming the margin, a known method is usable without any especial limitation, the method being, for example, a tape method of using a tape to make a mask when the metal is deposited, or an oil method of using an application of an oil to make a mask.

In still another embodiment of the present invention, provided is also a capacitor including the above-mentioned metallized film for the capacitor (also referred to as a capacitor element or a film capacitor element, or merely as an element). This capacitor is producible, using the above-mentioned metallized film for the capacitor. For example, two metallized films produced as described above are used as paired films, and the films are put onto each other to laminate their metal vapor deposition films and their films for the capacitor alternately onto each other. The resultant is wound up, and then paired metallikon electrodes are formed onto both end surfaces of the wound product by metal spraying, respectively. In this way, a film capacitor element can be produced.

When the capacitor element is produced, the two paired metallized films are usually put onto each other to position their insulating margins at sides of the element that are reverse to each other, and the resultant is wound up. At this time, the two paired metallized films are preferably laminated onto each other to be shifted from each other by a distance of 0.5 to 2 mm. The used winding machine is not particularly limited, and may be, for example, an automatically winding machine, 3KAW-N2, manufactured by Kaido Mfg. Co., Ltd.

After the winding, the resultant wound product is usually subjected to thermal treatment (also referred to as "hot pressing" hereinafter) while pressure is applied to the product. When the hot pressing causes an appropriate fastening of the winding of the film capacitor element and an appropriate change in its crystal structure, the product can gain mechanical and thermal stability. However, if the hot pressing causes an excessive fastening of the winding of the element and an excessive change in its crystal structure, the pressed film does not endure the heat to be shrunken so that the film suffers from problems such as thermal wrinkles, or shaping defects such as marking. From such a viewpoint the applied pressure, the optimal value of which is varied in accordance with the thickness of the film for the capacitor and other factors, is preferably from $10 \times 10^4$ to $450 \times 10^4$ Pa, more preferably from $15 \times 10^4$ to $300 \times 10^4$ Pa, even more preferably from $20 \times 10^4$ to $150 \times 10^4$ Pa. The thermal treatment temperature is preferably from 100 to 120° C. The period when the thermal treatment is conducted is preferably 5 hours or longer, more preferably 10 hours or longer to give mechanical and thermal stability to the resultant. The period is preferably 20 hours or shorter, more preferably 15 hours or shorter to prevent thermal wrinkles and shaping defects such as marking.

Subsequently, metal is thermally sprayed onto both end surfaces of the wound product to form metallikon electrodes thereon, thereby producing a film capacitor element. Electrode terminals are usually jointed to the metallikon electrodes. The method for joining the electrodes to the electrode terminals is not particularly limited, and may be, for example, welding, ultrasonic welding, or soldering. In order to give weather resistance to the wound product and prevent the product from being particularly deteriorated by humidity, it is preferred to put the capacitor element airtightly into a case, and seal the case with a resin such as epoxy resin.

The capacitor element obtained in the present invention is a film capacitor element which includes (made of) a film having a metal foil piece, such as a metallized film, and which has a high voltage endurance at high temperature. The film having the metal foil piece may be, besides the metallized film, a wound-type film obtained by winding a metal foil piece and a film.

In an embodiment of the present invention, provided are also use of the following film and a method for using the same film as a film for a capacitor: a film including plural layers; having Cmu and Cmo satisfying the above-mentioned relational expression (1) wherein Cmu is the oxygen gas permeability coefficient of the film including the plural layers, and Cmo is the oxygen gas permeability coefficient of a film obtained when the film for the capacitor is formed in the form of a uniform single layer; and having a thickness of 1 to 35 μm. This film is usable to produce a capacitor. The use of this film makes it possible to produce a capacitor having a high voltage endurance at high temperature.

Examples of a testing method for examining the resistance of a capacitor element against being used include a "step-up test" and a "life (lifespan) test". These tests are each a testing method for evaluating the resistance of an element against being used. The "step-up test" is a testing method of repeating the application of a constant voltage onto a capacitor element over a constant period (short period) while the value of the voltage is raised little by little, and is a method for evaluating the resistance of the capacitor element against being used from the viewpoint of a voltage limitation (high voltage) thereof. The "life test" is a testing method of applying a constant voltage to a capacitor element over a long period, and is a method for evaluating the voltage endurance of the capacitor element over a long term, that is, the resistance of the capacitor element against being used from the viewpoint of a period when a decrease in the electrostatic capacity of the element is restrained, or the capacity changing rate ΔC of the element is in a permissible range (preferably −10% or more [after 200 hours] at a testing temperature of 105° C. when the thickness of the film is 2.5 μm) so that the capacitor does not suffer from runaway or the like.

About the capacitor element obtained in the present invention, in the case of, for example, a testing temperature of 105° C. and a film thickness of 2.5 μm, the voltage when the capacity changing rate ΔC evaluated in accordance with the "step-up test" is −5% is preferably more than 1100 V, more preferably 1120 V or more, even more preferably 1150 V or more, in particular preferably 1180 V or more although such a preferred value depends on the testing temperature and the film thickness. Moreover, the voltage when the capacity changing rate ΔC evaluated in accordance with the "step-up test" is −95% is preferably more than 1450 V, more preferably 1460 V or more, even more preferably 1470 V or more, in particular preferably 1480 V or more.

About the capacitor element obtained in the present invention, the capacity changing rate ΔC, after the application of the voltage (after 200 hours), evaluated in accordance with the "life test" is preferably −10% or more, more preferably −8% or more, even more preferably −6% or more, in particular −5% or more. The rated voltage of capacitors of a high-voltage type for hybrid cars is generally from 400 to 800 $V_D$; thus, such a capacitor may be evaluated under a condition that the applying voltage in the "life test" is, for example, 600 $V_{DC}$.

Specifically, a life test for a capacitor element may be made in accordance with the following steps:

A capacitor element is beforehand pre-heated at a test environment temperature (for example, 105° C.), and then the initial electrostatic capacity thereof is measured before the test, using a tester, LCR HiTESTER 3522-50, manufactured by Hioki E. E. Corp. Next, a high-voltage power source is used to continue to apply a DC voltage of 600 V to the capacitor element in a thermostat of 105° C. temperature for 200 hours. After the 200 hours elapse, the electrostatic capacity of the capacitor element is measured with the tester, and then the capacitor changing rate (ΔC) of the capacitor before and after the voltage application is calculated out. The capacitor changing rate (ΔC) of any capacitor element species after such 200 hours elapse is evaluated in accordance with the average of values of three capacitor elements of this species.

EXAMPLES

The following will describe the present invention more specifically by way of working examples thereof. However, these examples are examples for demonstrating the invention. Thus, the examples never limit the invention.

[Individual-Property-Value Evaluating Methods]

Methods for evaluating individual property values of each of the working examples are as follows:

(1) Measurement of Physical Properties of Each Thermoplastic Resin.

Polypropylene Resin

GPC (gel permeation chromatography) was used to measure the weight-average molecular weight (Mw) and the number-average molecular weight (Mn) of a polypropylene resin under the following conditions:

Measuring instrument: differential refractometer (RI) built-in type high-temperature GPC HLC-8121GPC-HT model, manufactured by Tosoh Corp.;
Columns: three connected columns, TSKgel GMHHR-H (20) HT, manufactured by Tosoh Corp.;
Column temperature: 140° C.;
Eluent: trichlorobenzene; and
Flow rate: 1.0 mL/min.

A standard polystyrene manufactured by Tosoh Corp. was used to prepare a calibration curve. A measured result was obtained in terms of the molecular weight of the polystyrene. Using a Q-factor, the resultant molecular weight was converted into the molecular weight of the polypropylene.

Polystyrene Resin

GPC (gel permeation chromatography) was used to measure the weight-average molecular weight (Mw) and the number-average molecular weight (Mn) of a polystyrene under the following conditions:

Measuring instrument: differential refractometer (RI) built-in type high-temperature GPC HLC-8121GPC-HT model, manufactured by Tosoh Corp.;
Columns: four connected columns, TSKgel Super H2500, manufactured by Tosoh Corp.;
Column temperature: 40° C.;
Eluent: THF; and
Flow rate: 0.5 mL/min.

A standard polystyrene manufactured by Tosoh Corp. was used to prepare a calibration curve. A measured result was obtained in terms of the molecular weight of the polystyrene.

Polyethylene Terephthalate Resin

In accordance with JIS K7367-5, a dropping-type capillary viscometer and an o-chlorophenol of 25° C. temperature were used to measure the viscosity of a polyethylene terephthalate resin. In this way, the intrinsic viscosity IV value thereof was measured.

(2) Film Thickness

In accordance with JIS-C2330, the thickness of a film was measured, using a paper thickness measuring instrument, MEI-11, manufactured by Citizen Seimitsu Co., Ltd.

(3) Breakdown Strength

In accordance with method B (flat electrode method) in JIS C2330 (2001) 7.4.11.2, a DC power source was used to measure the dielectric breakdown voltage value of a film twenty-eight times at 100° C. and a voltage-raising rate of 100 V/sec. Each of the resultant dielectric breakdown voltage values was divided by the thickness (μm) of the film. From the 28 measured results, the highest and the next highest values, and the lowest and the next lowest values were removed. The average of the 24 remaining values was defined as the breakdown strength ($V_{DC}$/μm) of the film.

(4) Oxygen Gas Permeability Coefficient

In accordance with JIS K7126-1:2006, the oxygen gas permeability coefficient of a film was measured through the following steps: The film was punched out into the form of a disc of 50 mm diameter. In this way, test pieces were collected. One of the test pieces was set to a gas permeability coefficient measuring instrument, BR-3, BT-3, manufactured by Toyo Seiki Kogyo Co., Ltd. The diameter of each permeability surface of the piece was set to 30 mm (permeability area: 706.5 mm$^2$), and the gas permeability of the film is measured by a pressure sensor method. A test gas used at this time was oxygen gas having a purity of 99.9% or more. The pressure of the test gas on the high-pressure side of the instrument was adjusted to a constant value of 100 kPa. The test environment temperature was adjusted to a constant value of 23° C. The film was tested three times. The average of values obtained in the three tests was used as the measured value of the film. By multiplying this oxygen gas permeability by the thickness of the test piece, the oxygen gas permeability coefficient of the film was gained.

(5) Helium Gas Permeability Coefficient

The helium gas permeability coefficient of a film was gained by the same method as in item (4) except that instead of oxygen gas, helium gas having a purity of 99.9% or more was used as the test gas.

[Thermoplastic Resins]

In the production of a film, for a capacitor, of each of working examples and comparative examples, polypropylene resin PP-1 (isostatic polypropylene, manufactured by Prime Polymer Co., Ltd.), polystyrene resin PSt, or polyethylene terephthalate resin PET was used. The weight-average molecular weight (Mw) of polypropylene resin PP-1 was 31×10$^4$, and the molecular weight distribution (Mw/Mn) thereof was 8.6. These values are values measured in accordance with the above-mentioned measuring method in the state that this resin is in the form of raw resin pellets. The weight-average molecular weight (Mw) of polystyrene resin PSt was $18 \times 10^4$, and the molecular weight distribution (Mw/Mn) thereof was 2.9. These values are values measured in accordance with the above-mentioned measuring method in the state that this resin is in the form of raw resin pellets. The IV value of polyethylene terephthalate resin PET was 0.74.

Example 1

A thermoplastic resin composition 1 was supplied into each of monoaxial extruders (A) and (B), this composition 1 being composed of polypropylene resin PP-1 and antioxidants (5000 ppm by mass of Irganox 1010 and 2000 ppm by mass of BHT were included in 100 parts by mass of the resin), and then heated and melted at a resin temperature of 250° C. to obtain melted resin composition fractions. Next, before the melted resin composition fractions were introduced into feed blocks, the fractions were laminated onto each other into a three-layer form, the order of the three layers being A (the melted resin composition from the monoaxial extruder (A)), B (the melted resin composition from the monoaxial extruder (B)) and A. Thereafter, first one of the feed blocks was used to divide the three-layer-form melted resin composition into two. The two were laminated onto each other into six layers. Next, second one of the feed blocks was used to divide the six-layer-form melted resin composition into two, and then the two were laminated onto each other to laminate the melted resin composition into 12 laminated layers ($3 \times 2^2$ layers) to obtain a melted laminated body a1. Next, a T die was used to extrude out (eject) the melted laminated body a1, and next the extruded-out (ejected) melted laminated body a1 was wound onto a metallic drum having a surface temperature kept at 55° C. to be solidified. In this way, a cast sheet of about 400 µm thickness was obtained. At this time, the respective ejection proportions of the composition from the monoaxial extruders (A) and (B) were adjusted to make the respective thicknesses of the layers of the melted laminated body a1 equal to each other. This cast sheet was stretched so as to cause increase in dimension by a factor of 5 in the flow direction and next stretched so as to cause increase in dimension by a factor of 9 in the lateral direction at a temperature of 165° C. using a batch type biaxial orienting machine KARO IV manufactured by Bruckner Maschinenbau GmbH to obtain a biaxially oriented polypropylene film of 9 µm thickness.

Example 2

In the same way as in Example 1, the feed blocks were used to obtain a melted laminated body a1 in which the melted resin composition was laminated into 12 laminated layers. Next, the thermoplastic resin composition 1 was supplied into a monoaxial extruder (C) to obtain a melted resin composition. This composition was used to lay a front skin layer and a rear skin layer (referred to also as a front layer and a rear layer) onto the front surface and the rear surface of the melted laminated body a1, respectively, to laminate the composition into 14 layers ("$1+3 \times 2^2+1$" layers) to obtain a melted laminated body b1. Next, a T die was used to extrude out (eject) the melted laminated body b1. At this time, the same process as in Example 1 was performed except that (1) the ejection proportion from the monoaxial extruder (C) was adjusted to set, to ¼ of the total thickness of the melted laminated body b1, the total of the thickness of the skin layer laid on the front surface of the melted laminated body a1 and that of the skin layer laid on the rear surface thereof, and (2) the respective ejection proportions from the monoaxial extruders (A) and (B) were adjusted to make the respective thicknesses of the layers of the melted laminated body a1 from which the individual skin layers were removed equal to each other. In this way, a biaxially oriented polypropylene film of 9 µm thickness was obtained.

An optical microscope (OPTIPHOT 200, manufactured by Nikon Corp.) was used to observe a cross section of the biaxially oriented polypropylene film obtained in Example 2. The result is shown in FIG. 1. The magnification thereof was 1000 (that of the objective lens: 100; and that of the ocular lens: 10), and the observation was made by a bright-visual-field observing method.

Example 3

In the same way as in Example 1, a melted laminated body a1 was initially obtained. Next, by the use of third and fourth feed blocks, which followed that of the second feed block, the step of dividing the melted laminated body a1 further into two and laminating the two onto each other was further repeated two times to perform laminating. Thus, the melted resin composition was laminated into 48 layers ($3 \times 2^4$ layers) to obtain a melted laminated body c1. Next, the same process as in Example 1 was performed except that instead of the melted laminated body a1, the melted laminated body c1 was used. In this way, a biaxially oriented polypropylene film of 9 µm thickness was obtained

Example 4

In the same way as in Example 1, a melted laminated body a1 was initially obtained. Next, by the use of third and fourth feed blocks, which followed that of the second feed block, the step of dividing the melted laminated body a1 into two and laminating the two onto each other was repeated two times to laminate the melted resin composition into 48 laminated layers to obtain a melted laminated body c1. Next, a front skin layer and a rear skin layer were laid, respectively, onto the front surface and the rear surface of the melted laminated body c1, using a melted resin composition fraction obtained by supplying the thermoplastic resin composition 1 into the monoaxial extruder (C), to laminate the melted resin composition into 50 laminated layers ($1+3 \times 2^4+1$ layers). In this way, a melted laminated body d1 was obtained. At this time, the same process as in Example 1 was performed except that (1) the ejection proportion from the monoaxial extruder (C) was adjusted to set, to ¼ of the total thickness of the melted laminated body d1, the total of the respective thicknesses of the skin layers laid on the front surface and on the rear surface, and (2) the respective ejection proportions from the monoaxial extruders (A) and (B) were adjusted to make the respective thicknesses of the layers of the melted laminated body c1 from which the individual skin layers were removed equal to each other. In this way, a biaxially oriented polypropylene film of 9 µm thickness was obtained.

Example 5

In the same way as in Example 1, a melted laminated body a1 was initially obtained. Next, by the use of third, fourth, fifth and sixth feed blocks, which followed that of the second feed block, the step of dividing the melted laminated body a1 into two and laminating the two onto each other was further repeated four times to laminate the melted resin composition into 192 laminated layers ($3 \times 2^6$ layers) to obtain a melted laminated body e1. Next, the same process as in Example 1 was performed except that instead of the melted laminated body a1, the melted laminated body e1 was used. In this way, a biaxially oriented polypropylene film of 9 μm thickness was obtained.

Example 6

In the same way as in Example 1, a melted laminated body a1 was initially obtained. Next, by the use of third, fourth, fifth and sixth feed blocks, which followed that of the second feed block, the step of dividing the melted laminated body a1 into two and laminating the two onto each other was further repeated four times to laminate the melted resin composition into 192 laminated layers ($3 \times 2^6$ layers) to obtain a melted laminated body e1. Next, a front skin layer and a rear skin layer were laid, respectively, onto the front surface and the rear surface of the melted laminated body e1, using a melted resin composition fraction obtained by supplying the thermoplastic resin composition 1 into the monoaxial extruder (C), so as to laminate the melted resin composition into 194 laminated layers ($1+3 \times 2^6+1$ layers). In this way, a melted laminated body f1 was obtained. At this time, the same process as in Example 1 was performed except that (1) the ejection proportion from the monoaxial extruder (C) was adjusted to set, to ¼ of the total thickness of the melted laminated body f1, the total of the respective thicknesses of the skin layers laid on the front surface and on the rear surface, and (2) the respective ejection proportions from the monoaxial extruders (A) and (B) were adjusted to make the respective thicknesses of the layers of the melted laminated body e1 from which the individual skin layers were removed equal to each other. In this way, a biaxially oriented polypropylene film of 9 μm thickness was obtained.

Example 7

The thermoplastic resin composition 1 used in Example 1 was supplied to monoaxial extruders (A), (B) and (C), and heated and melted at a resin temperature of 250° C. to obtain melted resin composition fractions. Before the melted resin composition fractions were introduced into feed blocks of the monoaxial extruders (A), (B) and (C), the melted resin composition fractions were next laminated, in a melted state, into five-layer-form laminated layers, the order of the layers being C (the melted resin composition from the monoaxial extruder (C)), A (the melted resin composition from the monoaxial extruder (A)), B (the melted resin composition from the monoaxial extruder (B)), A and C. In this way, a melted laminated body g1 was obtained. Next, first to sixth ones of the feed blocks were used to repeat, six times, the step of dividing the melted laminated body g1 into two and laminating the two onto each other. Consequently, the composition was laminated into 320 laminated layers ($5 \times 2^6$ layers). In this way, a melted laminated body hi was obtained. At this time, the same process as in Example 1 was performed except that the respective ejection proportions from the monoaxial extruders (A), (B) and (C) were adjusted to make the respective thicknesses of the layers of the melted laminated body equal to each other. In this way, a biaxially oriented polypropylene film of 9 μm thickness was obtained.

Example 8

A biaxially oriented polypropylene film of 9 μm thickness was obtained in the same way as in Example 6 except that the respective ejection proportions from the monoaxial extruders (A) and (B) were adjusted to make the thickness of each of the layers originating from the monoaxial extruder (B) four times larger than that of each of the layers originating from the monoaxial extruder (A), and make the individual layers into a state that any one of the layers was different in thickness from the layer(s) adjacent to the layer.

Comparative Example 1 (Reference Example)

The thermoplastic resin composition 1 used in Example 1 was supplied to a monoaxial extruder (A), and heated and melted at a resin temperature of 250° C. to obtain a melted resin composition. Next, the same process as in Example 1 was performed except that without using any feed block, the melted resin composition was not laminated into plural layers. In this way, a biaxially oriented polypropylene film of 9 μm thickness was obtained.

Comparative Example 2

The thermoplastic resin composition 1 used in Example 1 was supplied to monoaxial extruders (A) and (B), and heated and melted at a resin temperature of 250° C. to obtain melted resin composition fractions. Next, without using any feed block, the melted resin composition fractions were laminated onto each other into two laminated layers. In this way, a melted laminated body ii was obtained. At this time, the same process as in Example 1 was performed except that the respective ejection proportions from the monoaxial extruders (A) and (B) were adjusted to make the respective thicknesses of the layers of the melted laminated body ii equal to each other. In this way, a biaxially oriented polypropylene film of 9 μm thickness was obtained.

Comparative Example 3

The thermoplastic resin composition 1 used in Example 1 was supplied to monoaxial extruders (A) and (B), and heated and melted at a resin temperature of 250° C. to obtain melted resin composition fractions. Next, the monoaxial extruders (A) and (B) were used to laminate the melted resin composition fractions, in a melted state, into three-layer-form laminated layers, the order of the three layers being A, B and A. In this way, a melted laminated body j1 was obtained. Next, without using any feed block, a monoaxial extruder (C) was used to lay skin layers, respectively, onto the front surface and the rear surface of the melted laminated body j1. In this way, a melted laminated body k1 of five layers was obtained. At this time, the same process as in Example 1 was performed except that the respective ejection proportions from the monoaxial extruders (A), (B) and (C) were adjusted to make the respective thicknesses of the layers of the melted laminated body k1 equal to each other. In this way, a biaxially oriented polypropylene film of 9 μm thickness was obtained.

About each of the resultant biaxially oriented polypropylene films, the breakdown strength was evaluated in accordance with the above-mentioned method. The resultant evaluation results were shown in Table 1. Table 1 also shows, about each of the working examples and the comparative examples, the number of its layers, the helium gas permeability coefficient [(mol·m)/(m²·s·Pa)], the oxygen gas permeability coefficient (Cmu) [(mol·m)/(m²·s·Pa)], the Cmo/Cmu ratio, the film thickness (B) [μm], the layer thickness (A) [μm] per layer in the film, and the A/B ratio.

TABLE 1

| | | The number of layers | Helium gas permeability coefficient [(mol · m)/(m² · s · Pa)] | Oxygen gas permeability coefficient (Cmu) [(mol · m)/(m² · s · Pa)] | Cmo/Cmu | Film thickness [μm] (=B) | Layer thickness [μm] per layer (=A) | A/B | Breakdown strength [$V_{DC}$/μm] |
|---|---|---|---|---|---|---|---|---|---|
| Examples | 1 | 12 | $1.29 \times 10^{-15}$ | $1.78 \times 10^{-16}$ | 1.124 | 9 | 0.750 | 0.083 | 545 |
| | 2 | 14 | — | $1.78 \times 10^{-16}$ | 1.124 | 9 | 0.643 | 0.071 | 548 |
| | 3 | 48 | — | $1.65 \times 10^{-16}$ | 1.212 | 9 | 0.188 | 0.021 | 553 |
| | 4 | 50 | $1.30 \times 10^{-15}$ | $1.65 \times 10^{-16}$ | 1.212 | 9 | 0.180 | 0.020 | 555 |
| | 5 | 192 | — | $1.53 \times 10^{-16}$ | 1.307 | 9 | 0.047 | 0.005 | 556 |
| | 6 | 194 | $1.29 \times 10^{-15}$ | $1.53 \times 10^{-16}$ | 1.307 | 9 | 0.046 | 0.005 | 556 |
| | 7 | 320 | — | $1.48 \times 10^{-16}$ | 1.351 | 9 | 0.028 | 0.003 | 564 |
| | 8 | 194 | — | $1.53 \times 10^{-16}$ | 1.307 | 9 | 0.046 | 0.005 | 541 |
| Comparative Examples | 1 | 1 | — | $2.00 \times 10^{-16}$ (=Cmo) | 1 | 9 | 9 | 1 | 502 |
| | 2 | 2 | $1.30 \times 10^{-15}$ | $1.94 \times 10^{-16}$ | 1.031 | 9 | 4.5 | 0.5 | 516 |
| | 3 | 5 | — | $1.86 \times 10^{-16}$ | 1.075 | 9 | 1.8 | 0.2 | 527 |

Example 9

A thermoplastic resin composition 2 including polystyrene resin PSt was supplied to monoaxial extruders (A) and (B), and heated and melted at a resin temperature of 310° C. to obtain melted resin composition fractions. Before the melted resin composition fractions were introduced into feed blocks, the melted resin composition fractions were next laminated, in a melted state, into three-layer-form laminated layers, the order of the layers being A (the melted resin composition from the monoaxial extruder (A)), B (the melted resin composition from the monoaxial extruder (B)), and A. Thereafter, first one of the feed blocks was used to divide this three-layer-form melted resin composition into two, and the two were laminated onto each other into six laminated layers. Next, second one of the feed blocks was used to divide the six-layer-form melted resin composition into two. The two were laminated onto each other into 12 layers (3×2² layers). In this way, a melted laminated body a2 was obtained. Next, a T die was used to extrude out (eject) the melted laminated body a2, and next the extruded-out (ejected) melted laminated body a2 was wounded onto a metallic drum having a surface temperature kept at 70° C. to be solidified. In this way, a cast sheet of about 200 μm thickness was obtained. At this time, the respective ejection proportions from the monoaxial extruders (A) and (B) were adjusted to make the respective thicknesses of the layers of the melted laminated body a2 equal to each other. This cast sheet was stretched so as to cause increase in dimension by a factor of 2.5 in the flow direction and next stretched so as to cause increase in dimension by a factor of 2.5 in the lateral direction at a temperature of 115° C. using a batch type biaxial orienting machine KARO IV manufactured by Bruckner Maschinenbau GmbH. In this way, a biaxially oriented polystyrene film was obtained which had a thickness of 30 μm.

Example 10

In the same way as in Example 9, the feed blocks were initially used to obtain a melted laminated body a2 in which the melted resin composition was laminated into 12 layers. Next, the thermoplastic resin composition 2 was supplied into a monoaxial extruder (C) to obtain a melted resin composition. This composition was used to lay a front skin layer and a rear skin layer (referred to also as a front layer and a rear layer), respectively, onto the front surface and the rear surface of the melted laminated body a2 to laminate the composition into 14 layers (1+3×2²+1 layers) to obtain a melted laminated body b2. Next, a T die was used to extrude out (eject) the melted laminated body b2. At this time, the same process as in Example 1 was performed except that (1) the ejection proportion from the monoaxial extruder (C) was adjusted to set, to ¼ of the total thickness of the melted laminated body b2, the total of the thickness of the skin layer laid on the front surface of the melted laminated body a2 and that of the skin layer laid on the rear surface thereof, and (2) the respective ejection proportions from the monoaxial extruders (A) and (B) were adjusted to make the respective thicknesses of the layers of the melted laminated body a2 from which the individual skin layers were removed equal to each other. In this way, a biaxially oriented polystyrene film of 30 μm thickness was obtained.

Example 11

In the same way as in Example 9, a melted laminated body a2 was initially obtained. Next, by the use of third and fourth feed blocks, which followed that of the second feed block, the step of dividing the melted laminated body a2 further into two and laminating the two onto each other was further repeated two times to perform laminating. Thus, the melted resin composition was laminated into 48 layers (3×2⁴ layers) to obtain a melted laminated body c2. Next, the same process as in Example 9 was performed except that instead of the melted laminated body a2, the melted laminated body c2 was used. In this way, a biaxially oriented polystyrene film of 30 μm thickness was obtained.

Example 12

In the same way as in Example 9, a melted laminated body a2 was initially obtained. Next, by the use of third and fourth feed blocks, which followed that of the second feed block, the step of dividing the melted laminated body a2 into two and laminating the two onto each other was further repeated two times to laminate the melted resin composition into 48 laminated layers to obtain a melted laminated body c2. Next, a front skin layer and a rear skin layer were laid, respectively, onto the front surface and the rear surface of the melted laminated body c2, using the monoaxial extruder (C), to laminate the melted resin composition into 50 laminated layers (1+3×2⁴+1 layers). In this way, a melted laminated body d2 was obtained. At this time, the same process as in Example 9 was performed except that (1) the ejection proportion from the monoaxial extruder (C) was adjusted to set, to ¼ of the total thickness of the melted laminated body d2, the total of the respective thicknesses of the skin layers laid on the front surface and on the rear surface, and (2) the respective ejection proportions from the monoaxial extruders (A) and (B) were adjusted to make the respective thicknesses of the layers of the melted laminated body c2 from which the individual skin layers were removed equal to each other. In this way, a biaxially oriented polystyrene film of 30 µm thickness was obtained.

Example 13

In the same way as in Example 9, a melted laminated body a2 was initially obtained. Next, by the use of third, fourth, fifth and sixth feed blocks, which followed that of the second feed block, the step of dividing the melted laminated body a2 into two and laminating the two onto each other was further repeated four times, so as to laminate the melted resin composition into 192 laminated layers ($3 \times 2^6$ layers) to obtain a melted laminated body e2. Next, the same process as in Example 9 was performed except that instead of the melted laminated body a2, the melted laminated body e2 was used. In this way, a biaxially oriented polystyrene film of 30 µm thickness was obtained.

Example 14

In the same way as in Example 9, a melted laminated body a2 was initially obtained. Next, by the use of third, fourth, fifth and sixth feed blocks, which followed that of the second feed block, the step of dividing the melted laminated body a2 into two and laminating the two onto each other was further repeated four times, so as to laminate the melted resin composition into 192 laminated layers ($3 \times 2^6$ layers) to obtain a melted laminated body e2. Next, a front skin layer and a rear skin layer were laid, respectively, onto the front surface and the rear surface of the melted laminated body e2, using a melted resin composition fraction obtained by supplying the thermoplastic resin composition 2 into the monoaxial extruder (C), so as to laminate the melted resin composition into 194 laminated layers ($1+3 \times 2^6+1$ layers). In this way, a melted laminated body f2 was obtained. At this time, the same process as in Example 9 was performed except that (1) the ejection proportion from the monoaxial extruder (C) was adjusted to set, to ¼ of the total thickness of the melted laminated body f2, the total of the respective thicknesses of the skin layers laid on the front surface and on the rear surface, and (2) the respective ejection proportions from the monoaxial extruders (A) and (B) were adjusted to make the respective thicknesses of the layers of the melted laminated body e2 from which the individual skin layers were removed equal to each other. In this way, a biaxially oriented polystyrene film of 30 µm thickness was obtained.

Example 15

The thermoplastic resin composition 2 used in Example 9 was supplied to monoaxial extruders (A), (B) and (C), and heated and melted at a resin temperature of 250° C. to obtain melted resin composition fractions. Before the melted resin composition fractions were introduced into feed blocks of the monoaxial extruders (A), (B) and (C), the melted resin composition fractions were next laminated, in a melted state, into five-layer-form laminated layers, the order of the layers being C (the melted resin composition from the monoaxial extruder (C)), A (the melted resin composition from the monoaxial extruder (A)), B (the melted resin composition from the monoaxial extruder (B)), A and C. In this way, a melted laminated body g2 was obtained. Next, first to sixth ones of the feed blocks were used to repeat, six times, the step of dividing the melted laminated body g2 into two and laminating the two onto each other. Consequently, the composition was laminated into 320 laminated layers ($5 \times 2^6$ layers). In this way, a melted laminated body h2 was obtained. At this time, the same process as in Example 9 was performed except that the respective ejection proportions from the monoaxial extruders (A), (B) and (C) were adjusted to make the respective thicknesses of the layers of the melted laminated body equal to each other. In this way, a biaxially oriented polystyrene film of 30 µm thickness was obtained.

Comparative Example 4 (Reference Example)

The thermoplastic resin composition 2 used in Example 9 was supplied to a monoaxial extruder (A), and heated and melted at a resin temperature of 310° C. to obtain a melted resin composition. Next, the same process as in Example 9 was performed except that without using any feed block, the melted resin composition was not laminated into plural layers. In this way, a biaxially oriented polystyrene monolayered film of 30 µm thickness was obtained.

Comparative Example 5

The thermoplastic resin composition 2 used in Example 9 was supplied to monoaxial extruders (A) and (B), and heated and melted at a resin temperature of 310° C. to obtain melted resin composition fractions. Next, without using any feed block, the melted resin composition fractions were laminated onto each other into two laminated layers. In this way, a melted laminated body i2 was obtained. At this time, the same process as in Example 9 was performed except that the respective ejection proportions from the monoaxial extruders (A) and (B) were adjusted to make the respective thicknesses of the layers of the melted laminated body i2 equal to each other. In this way, a biaxially oriented polystyrene film of 30 µm thickness was obtained.

Comparative Example 6

The thermoplastic resin composition 2 used in Example 9 was supplied to monoaxial extruders (A) and (B), and heated and melted at a resin temperature of 310° C. to obtain melted resin composition fractions. Next, the monoaxial extruders (A) and (B) were used to laminate the melted resin composition fractions, in a melted state, into three-layer-form laminated layers, the order of the three layers being A, B and A. In this way, a melted laminated body j2 was obtained. Next, without using any feed block, a monoaxial extruder (C) was used to lay skin layers, respectively, onto the front surface and the rear surface of the melted laminated body j2. In this way, a melted laminated body k2 of five layers was obtained. At this time, the same process as in Example 9 was performed except that the respective ejection proportions from the monoaxial extruders (A), (B) and (C) were adjusted to make the respective thicknesses of the layers of the melted laminated body k2 equal to each other. In this way, a biaxially oriented polystyrene film of 30 µm thickness was obtained.

About each of the resultant biaxially oriented polystyrene films, the breakdown strength was evaluated in accordance with the above-mentioned method. The resultant evaluation results were shown in Table 2. Table 2 also shows, about each of the working examples and the comparative examples, the number of its layers, the oxygen gas permeability coefficient (Cmu) [(mol·m)/(m$^2$·s·Pa)], the Cmo/Cmu ratio, the film thickness (B) [µm], the layer thickness (A) [µm] per layer in the film, and the A/B ratio.

TABLE 2

|  |  | The number of layers | Oxygen gas permeability coefficient (Cmu) [(mol·m)/(m²·s·Pa)] | Cmo/Cmu | Film thickness [μm] (=B) | Layer thickness [μm] per layer (=A) | A/B | Breakdown strength [$V_{DC}$/μm] |
|---|---|---|---|---|---|---|---|---|
| Examples | 9 | 12 | $9.00 \times 10^{-17}$ | 1.111 | 30 | 2.5 | 0.083 | 285 |
|  | 10 | 14 | $8.90 \times 10^{-17}$ | 1.124 | 30 | 2.143 | 0.071 | 288 |
|  | 11 | 48 | $8.25 \times 10^{-17}$ | 1.212 | 30 | 0.625 | 0.021 | 306 |
|  | 12 | 50 | $8.25 \times 10^{-17}$ | 1.212 | 30 | 0.6 | 0.020 | 306 |
|  | 13 | 192 | $7.68 \times 10^{-17}$ | 1.302 | 30 | 0.156 | 0.005 | 320 |
|  | 14 | 194 | $7.65 \times 10^{-17}$ | 1.307 | 30 | 0.155 | 0.005 | 323 |
|  | 15 | 320 | $7.4 \times 10^{-17}$ | 1.351 | 30 | 0.094 | 0.003 | 330 |
| Comparative Examples | 4 | 1 | $1.00 \times 10^{-16}$ (=Cmo) | 1 | 30 | 30 | 1 | 242 |
|  | 5 | 2 | $9.80 \times 10^{-17}$ | 1.020 | 30 | 15 | 0.5 | 251 |
|  | 6 | 5 | $9.30 \times 10^{-17}$ | 1.075 | 30 | 6 | 0.2 | 273 |

Example 16

A polyethylene terephthalate resin PET was dried at 150° C. for 3 hours. Thereafter, a thermoplastic resin composition 3 including this polyethylene terephthalate resin PET was supplied to monoaxial extruders (A) and (B), and heated and melted at a resin temperature of 285° C. to obtain melted resin composition fractions. Before the melted resin composition fractions were introduced into feed blocks, the melted resin composition fractions were next laminated, in a melted state, into three-layer-form laminated layers, the order of the layers being A (the melted resin composition from the monoaxial extruder (A)), B (the melted resin composition from the monoaxial extruder (B)), and A. Thereafter, first one of the feed blocks was used to divide this three-layer-form melted resin composition into two, and the two were laminated onto each other into six laminated layers. Next, second one of the feed blocks was used to divide the six-layer-form melted resin composition into two. The two were laminated onto each other into 12 layers ($3 \times 2^2$ layers). In this way, a melted laminated body a3 was obtained. Furthermore, by the use of third and fourth ones of the feed blocks, which followed that of the second feed block, the step of dividing the melted laminated body a3 into two and laminating the two onto each other was further repeated two times, so as to laminate the melted resin composition into 48 laminated layers to obtain a melted laminated body b3. Next, a front skin layer and a rear skin layer were laid, respectively, onto the front surface and the rear surface of the melted laminated body b3, using a monoaxial extruder (C), so as to laminate the melted resin composition into 50 laminated layers ($1+3 \times 2^4+1$ layers). In this way, a melted laminated body c3 was obtained. Next, a T die was used to extrude out (eject) the melted laminated body c3, and next the extruded-out (ejected) melted laminated body c3 was wounded onto a metallic drum having a surface temperature kept at 25° C. to be solidified. In this way, a cast sheet of about 350 μm thickness was obtained. At this time, the ejection proportion from the monoaxial extruder (C) was adjusted to set, to ¼ of the total thickness of the melted laminated body c3, the total of the respective thicknesses of the skin layers laid on the front surface and on the rear surface. Moreover, the respective ejection proportions from the monoaxial extruders (A) and (B) were adjusted to make the respective thicknesses of the layers of the melted laminated body b3 from which the individual skin layers were removed equal to each other. This cast sheet was stretched so as to cause increase in dimension by a factor of 3.2 in the flow direction and next stretched so as to cause increase in dimension by a factor of 3.5 in the lateral direction at a temperature of 130° C., using a batch type biaxial orienting machine KARO IV manufactured by Bruckner Maschinenbau GmbH. The resultant was thermally treated at 230° C. for 20 seconds to be subjected to crystal orientation. In this way, a biaxially oriented polyethylene terephthalate of 30 μm thickness was obtained.

Comparative Example 7 (Reference Example)

The thermoplastic resin composition 3 used in Example 16 was supplied to a monoaxial extruder (A), and heated and melted at a resin temperature of 285° C. to obtain a melted resin composition. Next, the same process as in Example 16 was performed except that without using any feed block, the melted resin composition was not laminated into plural layers. In this way, a biaxially oriented polyethylene terephthalate monolayered film of 30 μm thickness was obtained.

Comparative Example 8

The thermoplastic resin composition 3 used in Example 16 was supplied to monoaxial extruders (A) and (B), and heated and melted at a resin temperature of 285° C. to obtain melted resin composition fractions. Next, without using any feed block, the melted resin composition fractions were laminated onto each other into two laminated layers. In this way, a melted laminated body d3 was obtained. At this time, the same process as in Example 16 was performed except that the respective ejection proportions from the monoaxial extruders (A) and (B) were adjusted to make the respective thicknesses of the layers of the melted laminated body d3 equal to each other. In this way, a biaxially oriented polyethylene terephthalate of 30 μm thickness was obtained.

About each of the resultant biaxially oriented polyethylene terephthalate films, the breakdown strength was evaluated in accordance with the above-mentioned method. The resultant evaluation results were shown in Table 3. Table 3 also shows, about each of the working example and the comparative examples, the number of its layers, the oxygen gas permeability coefficient (Cmu) [(mol·m)/(m²·s·Pa)], the Cmo/Cmu ratio, the film thickness (B) [μm], the layer thickness (A) [μm] per layer in the film, and the A/B ratio.

TABLE 3

|  | The number of layers | Oxygen gas permeability coefficient (Cmu) [(mol·m)/(m²·s·Pa)] | Cmo/Cmu | Film thickness [μm] (=B) | Layer thickness [μm] per layer (=A) | A/B | Breakdown strength [$V_{DC}$/μm] |
|---|---|---|---|---|---|---|---|
| Example | 16 | 50 | $1.83 \times 10^{-18}$ | 1.175 | 30 | 0.6 | 0.02 | 547 |
| Comparative | 7 | 1 | $2.15 \times 10^{-18}$ (=Cmo) | 1 | 30 | 30 | 1 | 492 |
| Examples | 8 | 2 | $2.07 \times 10^{-18}$ | 1.039 | 30 | 15 | 0.5 | 494 |

As shown in Table 1, the polypropylene biaxially oriented films of Examples 1 to 8 according to the present invention are high in breakdown strength than the films of Comparative Examples 1 and 2. Thus, it can be understood that the films of the invention have high electrically insulating characteristics at high temperature. Furthermore, it is understood that: the results of Examples 6 and 8 demonstrate that even when the ratio between the thickness of any one of their layers and that of (each) of the layer(s) adjacent thereto is varied, the films show a high breakdown strength; however, one of these cases or examples, in which the individual layers constituting the film are equal in thickness to each other, is higher in breakdown strength than the other.

As shown in Table 2, the polystyrene biaxially oriented films of Examples 9 to 15 according to the present invention also have a higher breakdown strength than the films each made of the same resin species. Thus, it can be understood that the films of the invention have excellent electrically insulating characteristics at high temperature. As shown in Table 3, the polyethylene terephthalate biaxially oriented film of Example 16 according to the invention also has a higher breakdown strength than the films each made of the same resin species. Thus, it can be understood that the films of the invention have excellent electrically insulating characteristics at high temperature.

According to these results, the biaxially oriented films of Examples 1 to 16, which have excellent electrically insulating characteristics, are very suitable for films for a capacitor.

INDUSTRIAL APPLICABILITY

The film of the present invention for the capacitor is excellent in breakdown strength. Thus, a capacitor including this film can be improved in voltage endurance at high temperature, particularly, initial voltage endurance.

The invention claimed is:

1. A film for a capacitor, the film comprising:
a plurality of layers, the film satisfying the following relational expression (1):

$$Cmo/Cmu \geq 1.1 \quad (1)$$

wherein Cmu is an oxygen gas permeability coefficient of the film for the capacitor, and Cmo is an oxygen gas permeability coefficient of an equivalent film that would be obtained if the film for the capacitor were to be formed as a uniform single layer; and
having a thickness of 1 to 35 μm,
wherein a thickness of each of the layers constituting the film is 900 nm or less,
wherein the plurality of layers comprises a thermoplastic resin composition wherein the thermoplastic resin composition in each of the layers is the same in the entirety thereof, and
wherein the thermoplastic resin composition comprises at least one thermoplastic resin selected from the group consisting of polypropylene, a polyvinyl resin, and a polyester resin.

2. The film for the capacitor according to claim 1, wherein the plurality of layers is 10 or more layers, and
the thickness of the film for the capacitor is 1 to 30 μm.

3. The film for the capacitor according to claim 2, wherein the thermoplastic resin is one or more species selected from the group consisting of polypropylene resin, polystyrene resin, and polyethylene terephthalate resin.

4. A metallized film for a capacitor, the metallized film comprising the film for the capacitor according to claim 1, and a metal vapor deposition film on one surface or each surface of the film for the capacitor.

5. A capacitor comprising the metallized film for the capacitor according to claim 4.

6. The film for the capacitor according to claim 1, wherein the plurality of layers has skin layers as an outermost layer on each of a front and a rear side of the plurality of layers, and the skin layers are thicker than a remaining other layers of the plurality of layers.

7. The film for the capacitor according to claim 1, wherein the thickness of the film for the capacitor is 1.6 to 10 μm.

8. A process for producing a film for a capacitor, the film comprising a plurality of layers, the film satisfying the following relational expression (1):

$$Cmo/Cmu \geq 1.1 \quad (1)$$

wherein Cmu is an oxygen gas permeability coefficient of the film for the capacitor, and Cmo is an oxygen gas permeability coefficient of an equivalent film that would be obtained if the film for the capacitor were to be formed as a uniform single layer, and having a thickness of 1 to 35 μm,
wherein a thickness of each of the layers constituting the film is 900 nm or less,
wherein the plurality of layers comprises a thermoplastic resin composition wherein the thermoplastic resin composition in each of the layers is the same in the entirety thereof, and
wherein the thermoplastic resin composition comprises at least one thermoplastic resin selected from the group consisting of polypropylene, a polyvinyl resin, and a polyester resin, the process comprising:
melting a thermoplastic resin composition to obtain a melted resin composition;
laminating the melted resin composition to obtain a melted laminated body having a plurality of laminated layers; and
co-extruding the melted laminated body to obtain an unoriented film.

9. The process according to claim 8, wherein the laminating is performed using a feed block.

10. The process according to claim 8, further comprising orienting the unoriented film.

11. The process according to claim 10 wherein the unoriented film is biaxially oriented.

12. The process according to claim 8, wherein the plurality of layers has skin layers as an outermost layer on each of a front and a rear side of the plurality of layers, and the skin layers are thicker than a remaining other layers of the plurality of layers.

13. The process according to claim 8, wherein the thickness of the film for the capacitor is 1.6 to 10 μm.

* * * * *